United States Patent
Grassadonia et al.

(10) Patent No.: US 10,762,495 B2
(45) Date of Patent: Sep. 1, 2020

(54) THIRD-PARTY ACCESS TO SECURE HARDWARE

(71) Applicant: Square, Inc., San Francisco, CA (US)

(72) Inventors: Brian Grassadonia, San Francisco, CA (US); Ayokunle Omojola, San Francisco, CA (US); Robert Andersen, San Francisco, CA (US); Michael Moring, San Francisco, CA (US); Daniele Perito, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 15/395,975

(22) Filed: Dec. 30, 2016

(65) Prior Publication Data
US 2018/0189777 A1    Jul. 5, 2018

(51) Int. Cl.
| | |
|---|---|
| *G06Q 20/36* | (2012.01) |
| *G06Q 20/40* | (2012.01) |
| *G06Q 20/08* | (2012.01) |
| *G06Q 20/02* | (2012.01) |

(52) U.S. Cl.
CPC ........ *G06Q 20/363* (2013.01); *G06Q 20/027* (2013.01); *G06Q 20/08* (2013.01); *G06Q 20/0855* (2013.01); *G06Q 20/40* (2013.01)

(58) Field of Classification Search
CPC .. G06Q 20/363; G06Q 20/40; G06Q 20/0855; G06Q 20/027; G06Q 20/08; G06Q 20/36; G06Q 20/02
See application file for complete search history.

(56) References Cited

U.S. PATENT DOCUMENTS

| | | |
|---|---|---|
| 7,089,208 B1 | 8/2006 | Levchin et al. |
| 7,149,510 B2 | 12/2006 | Hansson et al. |
| 7,813,996 B2 | 10/2010 | Kemp, II et al. |
| 8,504,097 B1 | 8/2013 | Cope et al. |
| 8,646,059 B1* | 2/2014 | von Behren ......... G06Q 20/367 719/311 |
| 8,712,407 B1* | 4/2014 | Cope ...................... H04W 4/00 455/426.1 |
| 8,762,272 B1 | 6/2014 | Cozens et al. |

(Continued)

FOREIGN PATENT DOCUMENTS

WO    2018/125689 A1    7/2018

OTHER PUBLICATIONS

Manvi et al., Secure Mobile Payment System in Wireless Environment, 2009 International Conference on Future Computer and Communication, 2009, pp. 31-35. (Year: 2009).*

(Continued)

*Primary Examiner* — Kenneth Bartley
(74) *Attorney, Agent, or Firm* — Baker Botts L.L.P.

(57) ABSTRACT

Integrating third-party applications and native applications allows platform designers to provide greater services than otherwise would be available. This integration can increase security, provide more features, and give users a better experience with devices. Examples of such integration can allow third-party applications to have access to hardware and to provide seamless services to users. Such services can include registering payment accounts, allowing for loyalty programs, and providing additional information and services in native applications to provide a seamless experience.

13 Claims, 18 Drawing Sheets

(56) References Cited

U.S. PATENT DOCUMENTS

| | | | |
|---|---|---|---|
| 9,027,102 B2* | 5/2015 | Katzer | G06F 21/6245 726/7 |
| 9,161,325 B1 | 10/2015 | Urbanek | |
| 9,324,067 B2* | 4/2016 | Van Os | G06Q 20/322 |
| 9,390,413 B2* | 7/2016 | Castell | G06Q 20/105 |
| 9,483,763 B2* | 11/2016 | Van Os | G06Q 20/40 |
| 9,536,080 B2* | 1/2017 | Kerr | G06F 21/52 |
| 9,595,031 B1 | 3/2017 | Grassadonia | |
| 9,613,208 B1* | 4/2017 | Paczkowski | G06F 21/53 |
| 9,760,871 B1* | 9/2017 | Pourfallah | G06Q 10/10 |
| 9,773,232 B1 | 9/2017 | Grassadonia | |
| 9,792,600 B1 | 10/2017 | Grassadonia | |
| 9,824,366 B2 | 11/2017 | Skowronek et al. | |
| 9,880,830 B2 | 1/2018 | Khan et al. | |
| 9,934,014 B2 | 4/2018 | Diebolt et al. | |
| 10,417,635 B1 | 9/2019 | Aaron | |
| 10,475,003 B2 | 11/2019 | Metral | |
| 2002/0188509 A1 | 12/2002 | Ariff et al. | |
| 2003/0200144 A1 | 10/2003 | Antonucci et al. | |
| 2003/0216996 A1* | 11/2003 | Cummings | G06Q 20/02 705/39 |
| 2006/0053056 A1 | 3/2006 | Alspach-Goss et al. | |
| 2007/0022019 A1 | 1/2007 | Sherwin et al. | |
| 2007/0235539 A1 | 10/2007 | Sevanto et al. | |
| 2008/0207124 A1 | 8/2008 | Raisanen et al. | |
| 2008/0208688 A1 | 8/2008 | Byerley et al. | |
| 2008/0238610 A1 | 10/2008 | Rosenberg et al. | |
| 2008/0262928 A1 | 10/2008 | Michaelis | |
| 2009/0164374 A1 | 6/2009 | Shastry | |
| 2009/0192928 A1 | 7/2009 | Abifaker | |
| 2009/0327010 A1 | 12/2009 | Vadhri | |
| 2010/0023449 A1 | 1/2010 | Skowronek et al. | |
| 2010/0063893 A1* | 3/2010 | Townsend | G06Q 20/12 705/26.1 |
| 2010/0145861 A1* | 6/2010 | Law | G06Q 20/102 705/76 |
| 2010/0161377 A1 | 6/2010 | Hines et al. | |
| 2010/0306076 A1* | 12/2010 | Taveau | G06Q 20/02 705/26.8 |
| 2010/0306107 A1* | 12/2010 | Nahari | G06Q 20/02 705/44 |
| 2011/0071895 A1 | 3/2011 | Masri | |
| 2011/0078260 A1 | 3/2011 | Rashad et al. | |
| 2011/0208656 A1 | 8/2011 | Alba et al. | |
| 2011/0212762 A1 | 9/2011 | Ocko et al. | |
| 2011/0225264 A1 | 9/2011 | Serar | |
| 2011/0307318 A1 | 12/2011 | LaPorte et al. | |
| 2012/0078735 A1* | 3/2012 | Bauer | G06Q 20/20 705/16 |
| 2012/0123935 A1* | 5/2012 | Brudnicki | G06Q 20/20 705/41 |
| 2012/0124658 A1* | 5/2012 | Brudnicki | G06F 21/34 726/9 |
| 2012/0129452 A1 | 5/2012 | Koh et al. | |
| 2012/0143706 A1* | 6/2012 | Crake | G06Q 20/20 705/18 |
| 2012/0158744 A1 | 6/2012 | Tseng et al. | |
| 2012/0239469 A1 | 9/2012 | Steinberg et al. | |
| 2013/0013499 A1 | 1/2013 | Kalgi | |
| 2013/0024506 A1 | 1/2013 | Setton | |
| 2013/0060618 A1* | 3/2013 | Barton | G06Q 20/3223 705/14.23 |
| 2013/0110610 A1 | 5/2013 | Boyd | |
| 2013/0124361 A1 | 5/2013 | Bryson | |
| 2013/0140360 A1 | 6/2013 | Graylin | |
| 2013/0246199 A1* | 9/2013 | Carlson | G06Q 20/20 705/16 |
| 2013/0318592 A1* | 11/2013 | Grier, Sr. | H04L 9/3234 726/9 |
| 2013/0346302 A1 | 12/2013 | Purves et al. | |
| 2014/0074569 A1 | 3/2014 | Francis et al. | |
| 2014/0074637 A1* | 3/2014 | Hammad | G06Q 20/12 705/21 |
| 2014/0075567 A1* | 3/2014 | Raleigh | H04W 12/10 726/26 |
| 2014/0101042 A1 | 4/2014 | Grissom et al. | |
| 2014/0108263 A1* | 4/2014 | Ortiz | G06Q 20/3278 705/71 |
| 2014/0250006 A1* | 9/2014 | Makhotin | G06Q 20/02 705/41 |
| 2014/0279436 A1 | 9/2014 | Dorsey et al. | |
| 2015/0019443 A1* | 1/2015 | Sheets | G06Q 20/3278 705/71 |
| 2015/0052064 A1* | 2/2015 | Karpenko | G06Q 20/3829 705/71 |
| 2015/0112774 A1 | 4/2015 | Georgoff et al. | |
| 2015/0120472 A1 | 4/2015 | Aabye et al. | |
| 2015/0127549 A1* | 5/2015 | Khan | G06Q 20/20 705/71 |
| 2015/0127550 A1* | 5/2015 | Khan | G06Q 20/40145 705/71 |
| 2015/0142644 A1* | 5/2015 | Vaid | G06Q 20/10 705/39 |
| 2015/0193224 A1 | 7/2015 | Ziat et al. | |
| 2015/0199689 A1 | 7/2015 | Kumnick et al. | |
| 2015/0287037 A1 | 10/2015 | Salmon et al. | |
| 2015/0332262 A1 | 11/2015 | Lingappa | |
| 2015/0348002 A1* | 12/2015 | Van Os | G06Q 20/40 705/44 |
| 2015/0363771 A1 | 12/2015 | Graylin et al. | |
| 2015/0363781 A1 | 12/2015 | Badenhorst | |
| 2015/0371226 A1* | 12/2015 | Hurley | G06Q 20/40 705/64 |
| 2015/0379554 A1* | 12/2015 | Copeland | G06Q 30/0239 705/14.39 |
| 2016/0006699 A1 | 1/2016 | Taveau et al. | |
| 2016/0072800 A1 | 3/2016 | Soon-Shiong et al. | |
| 2016/0092872 A1* | 3/2016 | Prakash | G06Q 20/3829 705/65 |
| 2016/0224977 A1* | 8/2016 | Sabba | G06Q 20/385 |
| 2016/0247141 A1 | 8/2016 | Graylin et al. | |
| 2016/0260085 A1 | 9/2016 | Yen et al. | |
| 2016/0260117 A1 | 9/2016 | Yen et al. | |
| 2016/0292688 A1* | 10/2016 | Barton | G06Q 20/02 |
| 2016/0328693 A1* | 11/2016 | Mao | G06Q 20/0855 |
| 2016/0364721 A1 | 12/2016 | Deliwala et al. | |
| 2016/0371668 A1 | 12/2016 | Priebatsch et al. | |
| 2017/0017958 A1* | 1/2017 | Scott | G06Q 20/40 |
| 2017/0032370 A1 | 2/2017 | Beltramino et al. | |
| 2017/0046679 A1* | 2/2017 | Gotlieb | G06Q 20/20 |
| 2017/0091768 A1 | 3/2017 | Yoon | |
| 2017/0141926 A1* | 5/2017 | Xu | H04L 9/3263 |
| 2017/0278127 A1 | 9/2017 | Smrzlic et al. | |
| 2017/0357936 A1* | 12/2017 | Byington | G06Q 10/087 |
| 2018/0089434 A1 | 3/2018 | Sibert et al. | |
| 2018/0189778 A1 | 7/2018 | Grassadonia et al. | |

OTHER PUBLICATIONS

Weidong Guo, Design of Architecture for Mobile Payments System, IEEE, 2008, pp. 1732-1732. (Year: 2008).*

Non-Final Office Action dated Aug. 4, 2015, for U.S. Appl. No. 14/618,864, of Grassadonia, B., filed Feb. 10, 2015.

Non-Final Office Action dated Aug. 4, 2015, for U.S. Appl. No. 14/618,918, of Grassadonia, B., filed Feb. 10, 2015.

Non-Final Office Action dated Aug. 4, 2015, for U.S. Appl. No. 14/618,934, of Grassadonia, B., filed Feb. 10, 2015.

Non-Final Office Action dated Aug. 4, 2015, for U.S. Appl. No. 14/618,947, of Grassadonia, B., filed Feb. 10, 2015.

Non-Final Office Action dated Aug. 4, 2015, for U.S. Appl. No. 14/728,888, of Grassadonia, B., filed Jun. 2, 2015.

Final Office Action dated Nov. 24, 2015, for U.S. Appl. No. 14/728,888, of Grassadonia, B., filed Jun. 2, 2015.

Final Office Action dated Jan. 5, 2016, for U.S. Appl. No. 14/618,918, of Grassadonia, B., filed Feb. 10, 2015.

Final Office Action dated Jan. 5, 2016, for U.S. Appl. No. 14/618,947, of Grassadonia, B., filed Feb. 10, 2015.

Final Office Action dated Jan. 6, 2016, for U.S. Appl. No. 14/618,934, of Grassadonia, B., filed Feb. 10, 2015.

(56) References Cited

OTHER PUBLICATIONS

Notice of Allowance dated Nov. 2, 2016, for U.S. Appl. No. 14/618,947, of Grassadonia, B., filed Feb. 10, 2015.
Non-Final Office Action dated Jan. 17, 2017, for U.S. Appl. No. 14/618,918, of Grassadonia, B., filed Feb. 10, 2015.
Non-Final Office Action dated Jan. 18, 2017, for U.S. Appl. No. 14/618,934, of Grassadonia, B., filed Feb. 10, 2015.
Non-Final Office Action dated Jan. 18, 2017, for U.S. Appl. No. 14/728,888, of Grassadonia, B., filed Jun. 2, 2015.
Non Final Office Action dated Apr. 21, 2017, for U.S. Appl. No. 15/396,008, of Grassadonia, B., et al., filed Dec. 30, 2016.
Final Office Action dated May 22, 2017, for U.S. Appl. No. 14/618,934, of Grassadonia, B., filed Feb. 10, 2015.
Notice of Allowance dated May 23, 2017, for U.S. Appl. No. 14/618,918, of Grassadonia, B., filed Feb. 10, 2015.
Notice of Allowance dated Jun. 7, 2017, for U.S. Appl. No. 14/728,888, of Grassadonia, B., filed Jun. 2, 2015.
Notice of Allowance dated Sep. 29, 2017, for U.S. Appl. No. 14/618,934, of Grassadonia, B., filed Feb. 10, 2015.
Final Office Action dated Oct. 24, 2017, for U.S. Appl. No. 15/396,008, of Grassadonia, B., et al., filed Dec. 30, 2016.
Advisory Action dated Sep. 1, 2017, for U.S. Appl. No. 14/618,934, of Grassadonia, B., filed Feb. 10, 2015.
Non Final Office Action dated May 16, 2018, for U.S. Appl. No. 15/396,008, of Grassadonia, B., et al., filed Dec. 30, 2016.
International Search Report and Written Opinion for International Application No. PCT/US2017/067481, dated Mar. 26, 2018.
Final Office Action dated Dec. 31, 2018, for U.S. Appl. No. 15/396,008, of Grassadonia, B., et al., filed Dec. 30, 2016.
Cooper J., "Mobile Payments—Wallet Wars," The Finance Times Limited, The Banker, Aug. 2012, pp. 1-5.
Mulholland S., et al., "Protecting Payments to Counter Credit- and Debit-Card Fraud, Retailers are Exploring New Technologies Like Microchips, RFID and Biometrics," Supermarket News, Dec. 16, 2002, pp. 1-4.
Non-Final Office Action dated Nov. 27, 2019, for U.S. Appl. No. 15/396,008, of Grassadonia, B., et al., filed Dec. 30, 2016.

\* cited by examiner

THIRD-PARTY ACCESS TO SECURE HARDWARE

BACKGROUND

Mobile phone users typically receive applications or "apps" via online stores, but operating systems restrict access by these apps to certain application programming interfaces (APIs), such as the ability to interact with native apps, or hardware features, such as a secure subsystem holding confidential user information or including authentication devices, such as a retina scanner or fingerprint reader. Device makers include native applications that they develop for a specific platform, and they give these native applications access to restricted hardware and software APIs because these native applications are trustworthy.

DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

DESCRIPTION

Figure 1:
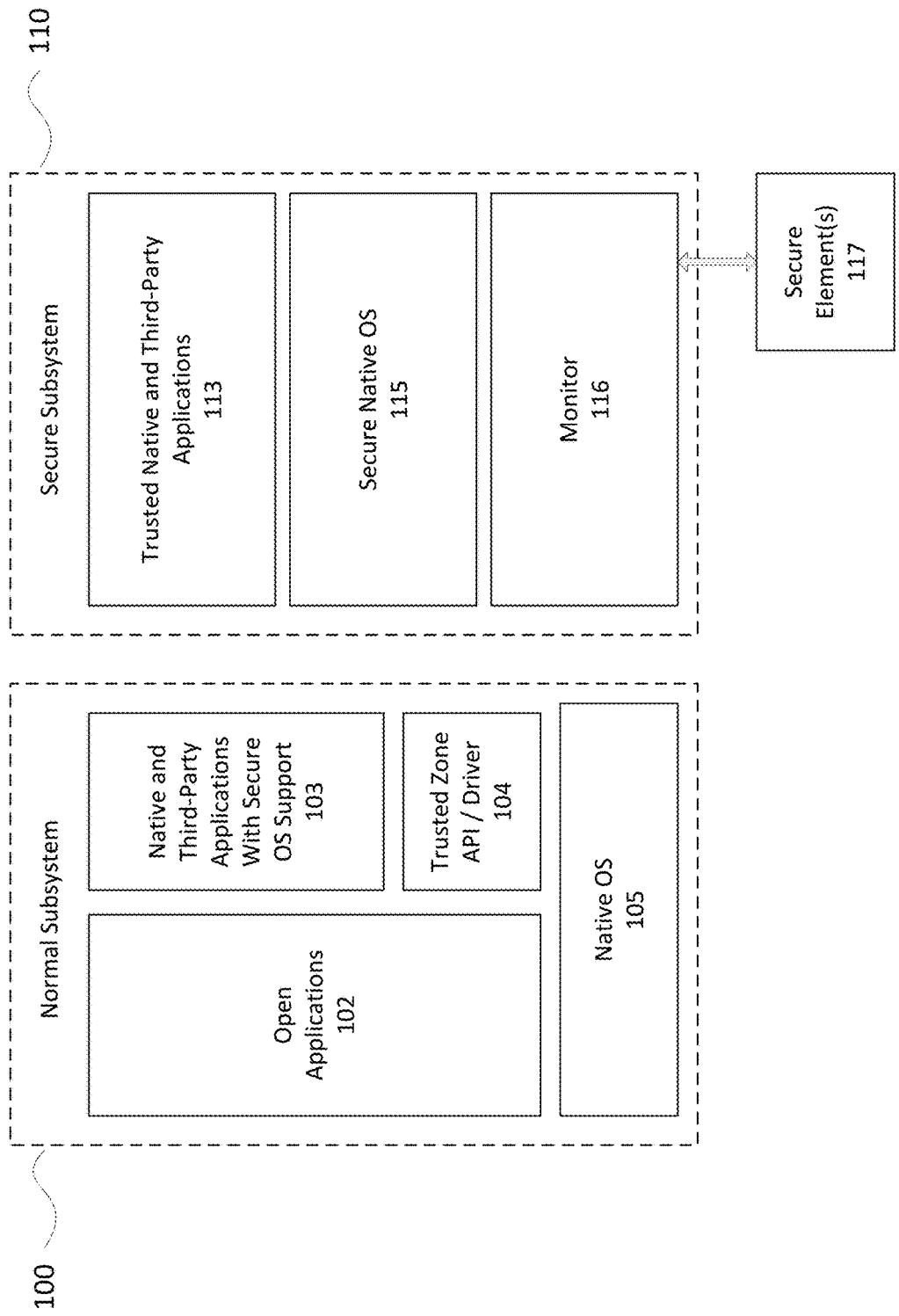
FIG. 1 illustrates an example system architecture for native and third-party application access to a secure subsystem, according to an embodiment.

To add more features to mobile devices, device manufactures rely on third-party app developers to supplement native apps that come with a mobile device. However, because these third-party apps are untrustworthy, the device manufactures limit the usefulness of some third-party apps. To add additional features to mobile devices, embodiments of this disclosure allow these third-party apps to have access to typically restricted features, such as thumbprint or retina scanner authentication and native app integration. To do this, the device manufacturer places a level of trust on the third-party app developer to use this access in a trustworthy manner. By granting this access, mobile devices can have seamlessly integrate features that otherwise would not be available. Moreover, by integrating a third-party application with a native application the user may not need to download a separate third-party application, at least in some embodiments.

The two currently leading mobile platforms, iOS and Android, have corresponding native wallet applications that allow users to input information including their credit or debit card information or loyalty cards. However, this information is basically a digital form of currently existing cards, i.e., the cards simply act like their real-world counterparts. The mobile device can make charges to a credit card or display a barcode associated with a loyalty program. These native wallet applications are therefore limited in the services they can offer because they might not have the expertise or manpower to provide all services that users desire. The native wallet application also does not have visibility into other aspects of a transaction, such as what exactly the user is purchasing and where the funds are coming from, which inhibits the possibility of increasing features to provide to users.

Examples of features enabled by embodiments herein include integrated third-party payment tools and payments-related services, including loyalty programs, communication applications, or map applications. Embodiments allow third-party payment applications to be seamlessly integrated into native wallet applications. These third-party payment applications can allow users to maintain a balance that they can add too or subtract from, or use to make payment requests or funds transfer requests. Currently, users use a third-party application to accomplish these tasks, but this increases the difficulty in executing a transaction and does not allow for access to features such as near-field communication (NFC) payments or fingerprint authentication. By giving a third-party payment application access to these hardware features, the third-party payment application can appear as if it is a native application to provide seamless integration, registration, and usage, without the need to open a separate payments-specific app.

Other embodiments described herein aim to give users automated notifications and tracking of events affecting their bank accounts, such as by predicting how transactions will affect the balance. This prediction can be presented on a user interface to provide users with information more efficiently and enable tracking of account activity at a level previously unavailable. In one example, an improved system architecture allows presentation on a user interface on a mobile device for credit and debit transactions in a conversational view format, with status updates that can reflect scheduled transactions and other recent transactions. Various embodiments of this improved system architecture provide several improvements over existing system architectures; for example, they can allow for more accurate, real-time accounting information by logically separating subaccounts at a server that has increased visibility of financial transactions. The increased visibility improves the function of the computer by allowing more control over the computer network and transactions that occur over the network, as explained throughout this specification.

The present disclosure is here described in detail with reference to embodiments illustrated in the drawings, which form a part here. Other embodiments may be used or other changes may be made without departing from the spirit or scope of the present disclosure. The illustrative embodiments described in the detailed description are not meant to be limiting of the subject matter presented here.

Various embodiments will now be described in further detail. The following description provides specific details for a thorough understanding and enabling description of these embodiments. One skilled in the relevant art will understand, however, that the embodiments discussed herein may be practiced without many of these details. Likewise, one skilled in the relevant art will also understand that the embodiments can include many other obvious features not described in detail herein. Additionally, some well-known structures or functions may not be shown or described in detail below, to avoid unnecessarily obscuring the relevant description.

The terms "connected" or "coupled" and related terms used throughout the description are used in an operational sense and are not necessarily limited to a direct physical connection or coupling. Thus, for example, two devices may be coupled directly, or via one or more intermediary media or devices. As another example, devices may be coupled in such a way that information can be passed there-between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one implementation of the disclosed technology, and may be included in more than one implementation. In addition, such phrases do not necessarily refer to the same embodiments or different embodiments.

The term "module" or "engine" refers broadly to general or specific-purpose hardware, software, or firmware (or any combination thereof) components. Modules and engines are typically functional components that can generate useful data or other output using specified input(s). A module or engine may or may not be self-contained. Depending upon implementation-specific or other considerations, the modules or engines may be centralized or functionally distributed. An application program (also called an "application") may include one or more modules and/or engines, or a module and/or engine can include one or more application programs.

The term "cause" and variations thereof, as used throughout this description, refers to either direct causation or indirect causation. For example, a computer system can "cause" an action by sending a message to a second computer system that commands, requests or prompts the second computer system to perform the action. Any number of intermediary devices may examine and/or relay the message during this process. In this regard, a device can "cause" an action even though it may not be known to the device whether the action will ultimately be executed or completed.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

Example Integrated System Architecture

Embodiments can take advantage of various architectures for integrating third-party applications with native applications and native hardware to allow for benefits that would otherwise not be available. Native applications, typically developed by platform original equipment manufacturers (OEMs), cannot provide all of the features that third parties can, who have nearly limitless resources and expertise, that the OEM cannot match. Therefore, to gain further functionality, ease of use, and a better user experience, embodiments can use various system architectures for providing this integration. FIG. 1 illustrates one such example.

FIG. 1 illustrates an example system architecture for native and integrated third-party application access to a secure subsystem. This embodiment includes normal subsystem 100 for running most third-party applications and secure subsystem 110 for running applications (native or third party) that use secure information or hardware components. These subsystems can be separated to secure personal information from malicious applications for user privacy, to restrict access to secure APIs or software, to restrict access to secure hardware, or any combination of these. The normal subsystem 100 can include open applications 102, where applications running, either in the foreground or background, can operate. Native and third-party applications with secure OS support 103 can include applications that are not currently running. Trusted zone API/driver 104 can allow access to the secure subsystem 110, if the application has appropriate permissions, or if trusted native and third-party applications 113 desire access to the applications 103. Native OS 105 can be any operating system, such as Windows®, iOS®, or Android®; however, the native OS 105 can have modifications to interoperate with the secure native OS 115, which administers the secure subsystem 110. Monitor 116 can be used to switch threads operating on the processor (not illustrated) from operating in a secure or unsecure mode, depending on the permissions of a given application and thread running on the processor. If the processor is running in secure mode because the monitor 116 switched to the secure state, the thread can have access to secure element(s) 117, which can be a hardware component, such as an antenna (e.g., Bluetooth or NFC), a fingerprint reader, or a memory holding confidential information, such as fingerprint or credit card information.

The example system architecture of FIG. 1 is for illustrative purposes only, and can be modified to have other configurations. For example, the trusted and native third-party applications need not reside in the secure subsystem 110, but can instead access the secure subsystem from the normal subsystem 100 when necessary, e.g., when an application needs to access the secure element(s) 117. Nonetheless, the illustrated embodiment and modifications of it can allow third-party trusted applications, such as a third-party payment application, to access the secure element(s) 117.

Registering Third-Party Payment Application User

The following discussion provides examples of seamlessly registering a user to have an account balance associated with a user device. By integrating a third-party payment application with a native application, such as a native wallet application, a user can more quickly, easily, and securely register an account. In the discussion of FIG. 1 above, which provides an example technical solution for integrating third-party applications, the third-party applications have access to secure features and native functionality to avoid the need to open different applications to access certain features. By allowing users to register for a third-party payment application within a native wallet application via a technical integration of the two using hardware and software, users have fewer steps to register, are more likely to register, and can achieve benefits of the third-party application that would otherwise not be possible.

Figure 2:
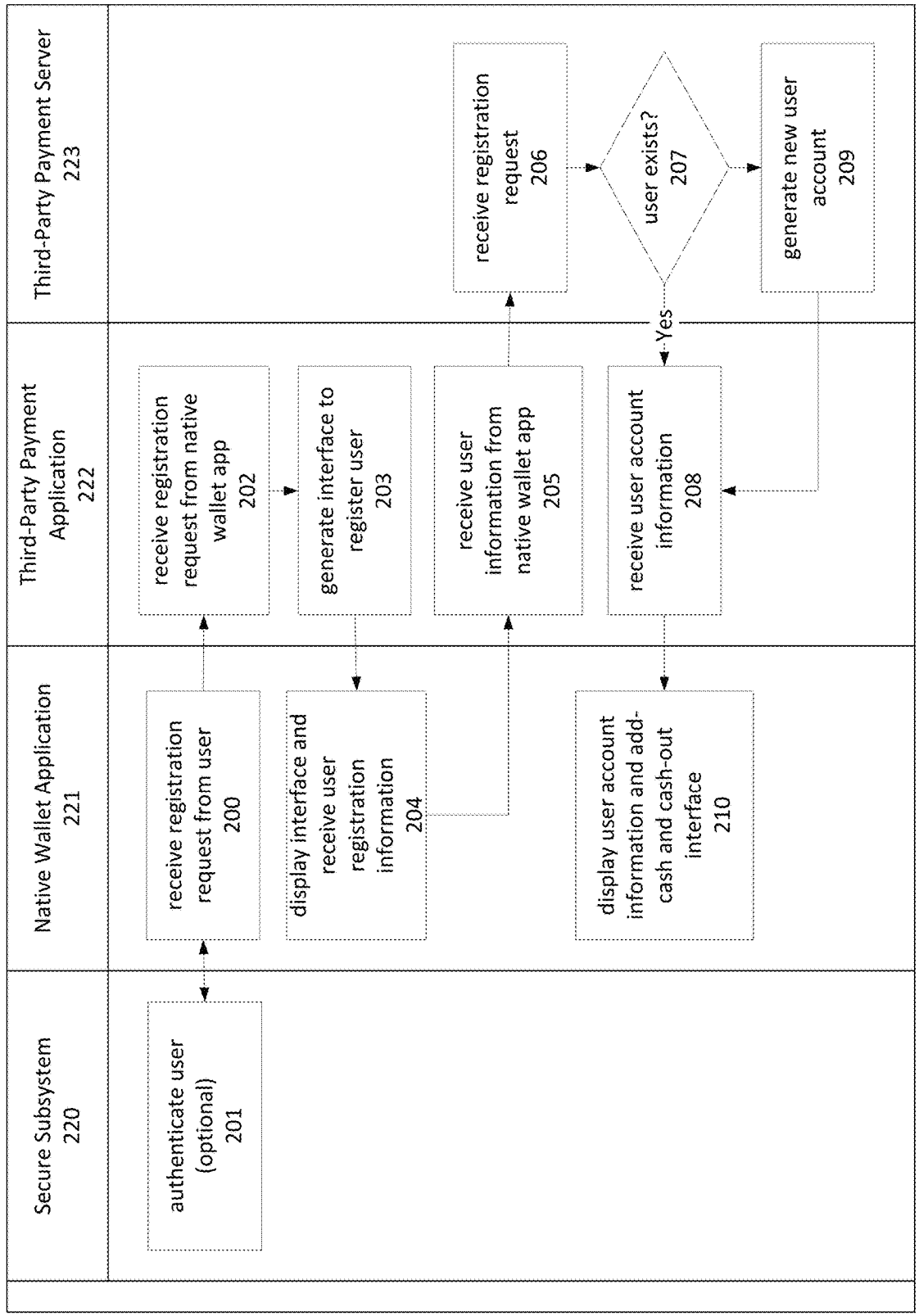
FIG. 2 illustrates an example cross-functional flowchart for registering a user on a user computing device and accessing a secure subsystem, according to an embodiment.

FIG. 2 illustrates an example cross-functional flowchart for registering a user to open an account and maintain a digital cash balance on a user computing device, and accessing a secure subsystem, according to an embodiment. The cross-functional flowchart includes several devices or applications (secure subsystem 220, native wallet application 221, third-party payment application 222, and third-party payment server 223) that can perform various steps. These steps can commence when a user wishes to register for a new account or automatically in response to a requested payment transaction, either at a merchant or to a contact in a native communication application. In step 200, the native wallet application 221 can receive a registration request from the user. This request can be initiated, for example, by a user input, either a voice command, selection of a registration icon, or an attempt to make a purchase. The native wallet application 221 or the third-party payment application 222 can optionally request authorization to open an account via the secure subsystem 220 in step 201. In step 202, the third-party payment application can receive the registration request from native wallet application 221 and generate a user interface (step 203) to register a user. The user interface can optionally include accepting terms and conditions that a user must accept before registering. In step 204, the native wallet application can display the user interface and receive user registration information via the user interface. Such user registration information can include name, address, credit/debit card number, social security information, email address, username, and password. The user registration information can also include acceptance terms and conditions for applying to open an account, such as an online bank account, and it can also include a unique device ID, such as an IMEI or ICCID number. In the case that the user already has an account, the user can simply input a username and password to log into their account. The native wallet application 221 can then transmit the user registration information to the third-party payment application 222 (step 205), which can then transmit the user registration information to the third-party payment server 223 to open the account online. The third-party payment server 223 receives the information in step 206 and can determine whether the user already has an account in step 207. If the user does not have an account, the third-party payment server 223 can generate a new user account, including a balance and an account number, in step 209. After completing step 209, or if the user already has an account, the third-party payment server 223 can transmit user account information, including a balance, e.g., balance amount, at least a portion of the account number, and a payment token associated with the device ID, to the third-party payment application 222 in step 208. Finally, in step 210, the native wallet application can display the user account information and options to add cash or cash out the balance, as illustrated in FIG. 4, discussed below.

Figure 3:
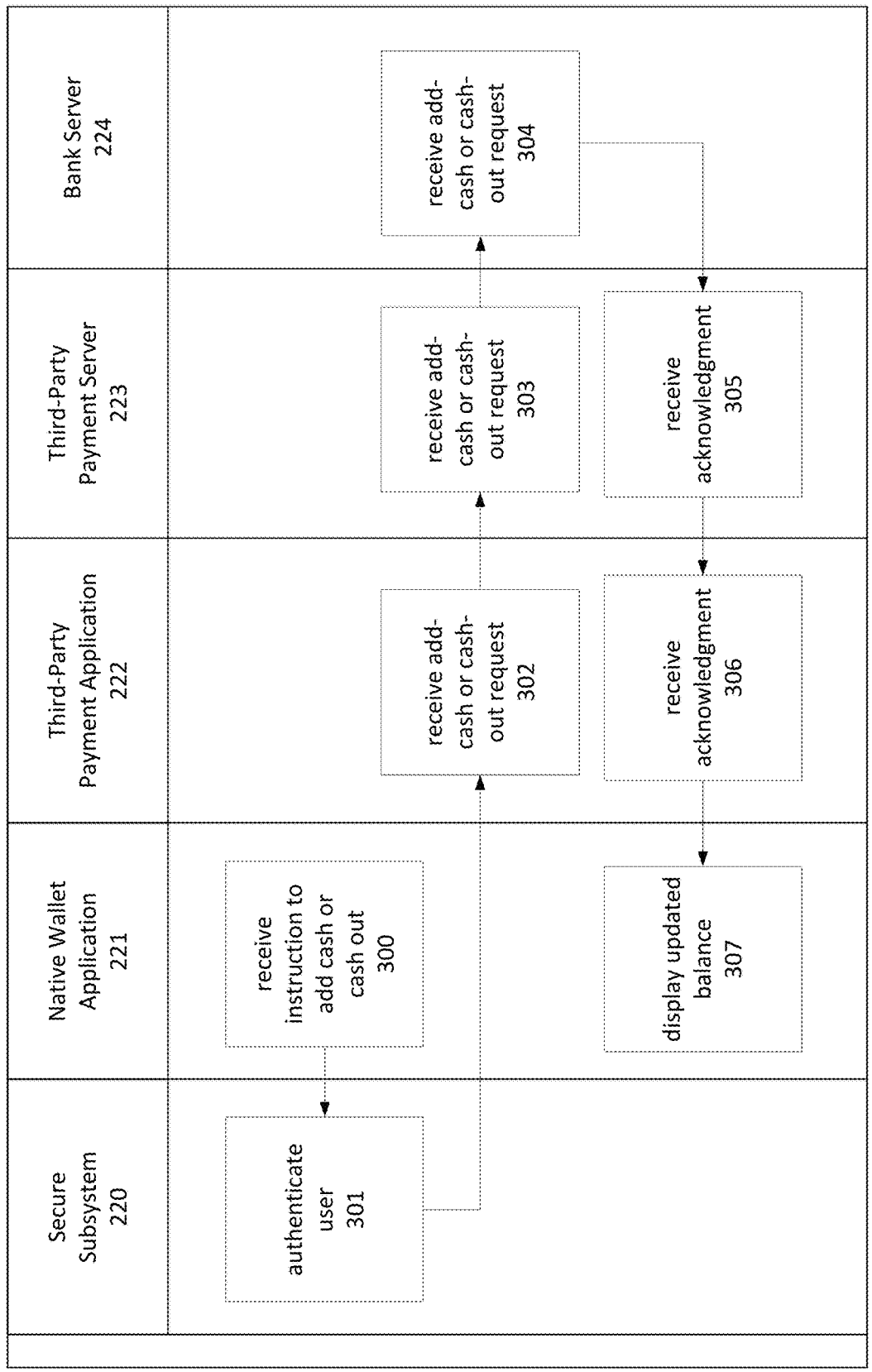
FIG. 3 illustrates an example cross-sectional flowchart for performing add-cash or cash-out operations, according to an embodiment.
Figure 4:
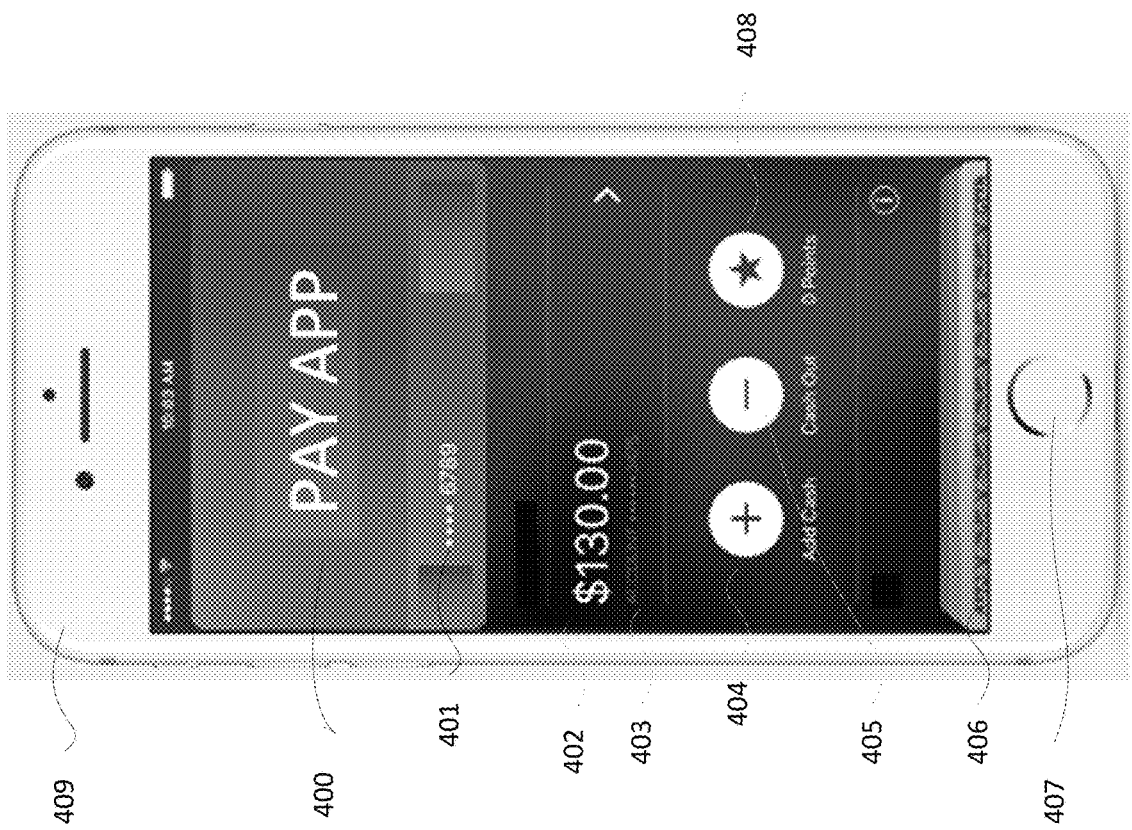
FIG. 4 illustrates an example of a user computing device with a user interface, according to an embodiment.

FIG. 3 illustrates a second example cross-sectional flowchart for performing add-cash or cash-out operations, according to an embodiment, such as the one illustrated in FIG. 4. The third-party payment application can perform these functions within the native wallet application, or the third-party payment application could prompt the user to download another application associated with the third-party payment application but having enhanced features. To begin the process, in step 300, of changing the balance by adding cash or taking cash out, the native wallet application 221 can receive an add-cash or cash-out request. Either the third-party payment application 222, or in this example the native wallet application 221, can send an authentication request to the secure subsystem 220 in step 301. The authentication request can comprise, for example, an instruction to enable a fingerprint reader and return a result of whether a fingerprint matches a stored fingerprint, thereby verifying a user's identity. Further in this example, the third-party payment application can receive the add-cash or cash-out request in step 302, and forward the request to the third-party payment server 223 in step 303. The bank can receive the add-cash or cash-out request in step 304, update the balance, and send an acknowledgment to the third-party payment server 223 (step 305), which can forward the acknowledgment to the third-party payment application 222 in step 306. Finally, the native wallet application 221 can display the updated balance, similar to the balance illustrated in FIG. 4 in step 307.

FIG. 4 illustrates an example of a user computing device with a user interface for registering a third-party payment application in a native wallet application 406 on a user computing device 409, according to an embodiment. The native wallet application includes a third-party payment application 400 that can display user information, such as a portion of a credit/debit card number 401, a balance 402, and a portion of an account number 403. The third-party payment application 400 can also present an add-cash user interface 404, a cash-out interface 405, and a loyalty points interface 408. The loyalty points and similar loyalty programs will be discussed further below in the context of example benefits of integrating a third-party payment application with a native wallet application. FIG. 4 also illustrates an example secure element 407, which in this case can be a fingerprint reader to verify user identity. The third-party payment application 400 can access the secure element 407 to execute payments, register an account, add cash, cash out, or other operations where user verification might be advantageous. The add-cash and cash-out interfaces were in the discussion above related to FIG. 3, and the account registration process was in the discussion above related to FIG. 2.

Figure 5:
FIG. 5 illustrates an example of a third-party payment application accessing a secure subsystem, according to an embodiment.

FIG. 5 illustrates an example of the third-party payment application 400 accessing a secure subsystem on user computing device 409, and further illustrates an example use of secure element 407. In one example, a user can request to cash out a balance, and the third-party payment application 400 can access the secure element 407 to confirm the user's identity before completing the transaction. Either the third-party payment application 400 or the native wallet application 406 can includes each of the elements of FIG. 4, with the addition of a security notification 500 to the user to require authentication by making an authentication request to the fingerprint reader 407. After the user verifies their identity via the fingerprint reader 407, third-party payment application can complete the current transaction, such as an add-cash or cash-out transaction.

Example Payments User Interface of Integrated Third-Party Payment Application

In addition to integration with a native wallet application, as discussed above with reference to FIGS. 2-5, embodiments can also integrate a third-party payment application a native communication application, as illustrated in FIGS. 6-12. One aspect of the disclosed technology includes enabling a user who is using a native communication application (e.g., simple message service (SMS) applications (Google Hangouts, Apple iMessage), or a native email application) to easily send money to another user who is also using the same native communication application. (Some of these communication applications may be trademarks of their respective owners.) The disclosed technology enables a third-party payment application to act as a background process (e.g., a user would not notice or know that background process is running during normal operation) associated with or incorporated in the native communication application, so as to provide the user with a "seamless" user experience (e.g., does not need to switch between the instant message application and the third-party payment application—there is no interruption of an existing dialogue or chat). In some embodiments, the disclosed technology can enable a payment service provided by a server (e.g., a cloud device) to act as a backend process (e.g., a user would not notice or know that backend process is running during normal operation) associated with the instant message application, so as to provide a "seamless" user experience. In some embodiments, a sematic analysis can be performed so as to determine whether a user really wants to pay the other user. In some embodiments, further user authorization can be required (e.g., to confirm with a user whether he or she really wants to pay the other user and/or verify a specified amount to be paid).

For example, when user A is chatting with user B on an instant message application associated with a payment service or a third-party payment application (as a background application), user A can specify that he or she wants to pay user B a specified amount of money (e.g., user A can say: "I would like to pay you $100 for dinner yesterday," "Here is $10 I owe you," or "I am sending you $50"). Once a currency identifier (e.g., the dollar sign "$") is detected, the third-party payment application can initiate a payment process. In some embodiments, the currency identifier can be a character, a string, a symbol, an embedded code, an insignia, etc. The payment process can start by, for example, searching user A's contact list for user B's contact information.

Once found, the payment process can then proceed by: (1) verifying whether user B has an existing service account with the payment service or the payment application; or (2) verifying whether user B has a previous transaction associated with the payment service or the payment application. If either of the two verifications has a positive outcome, the payment application can continue to pay user B based on the information learned from the existing service account or the previous transaction (e.g., details can be found throughout this detailed description). If neither of the two verifications has a positive outcome, then the payment application can initiate an invitation process (e.g., details can be found throughout this detailed description) by sending out an invitation for requesting financial information and creating a new account associated with the payment service or the payment application to user B.

Figure 6:
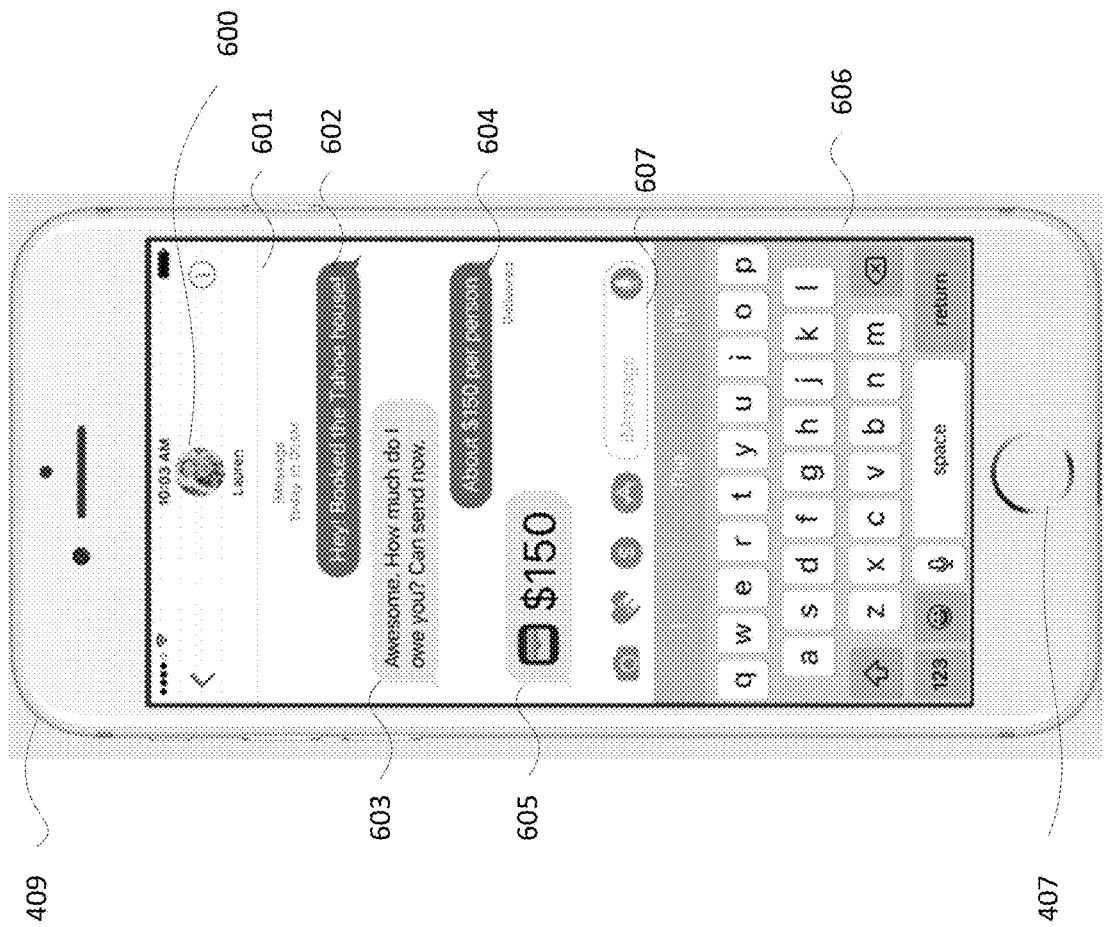
FIG. 6 illustrates an example of seamless integration of a third-party payment application with a native communication application to receive a payment, according to an embodiment.

FIG. 6 illustrates an example of seamless integration of a third-party payment application with a native communication application 601 to receive a payment on user computing device 409, according to an embodiment. The native communication application 601 can include an image 600 associated with the recipient of the messages, "Lauren" in this example. The native communication application 601 includes several messages (601-605) in the conversation. Messages on the right (602 and 604) are from the user of user computing device 409, and messages on the left (603 and 605) are from Lauren. In this example, Lauren has sent the user $150, as illustrated by message 605, which includes an indication of payment via an icon and an amount. The user can respond by typing a message into field 607 using keyboard 606. The user can also select the message 605 by, for example, touching it, which can cause the integrated third-party payment application to present a user interface 700, as illustrated in FIG. 7.

Figure 7:
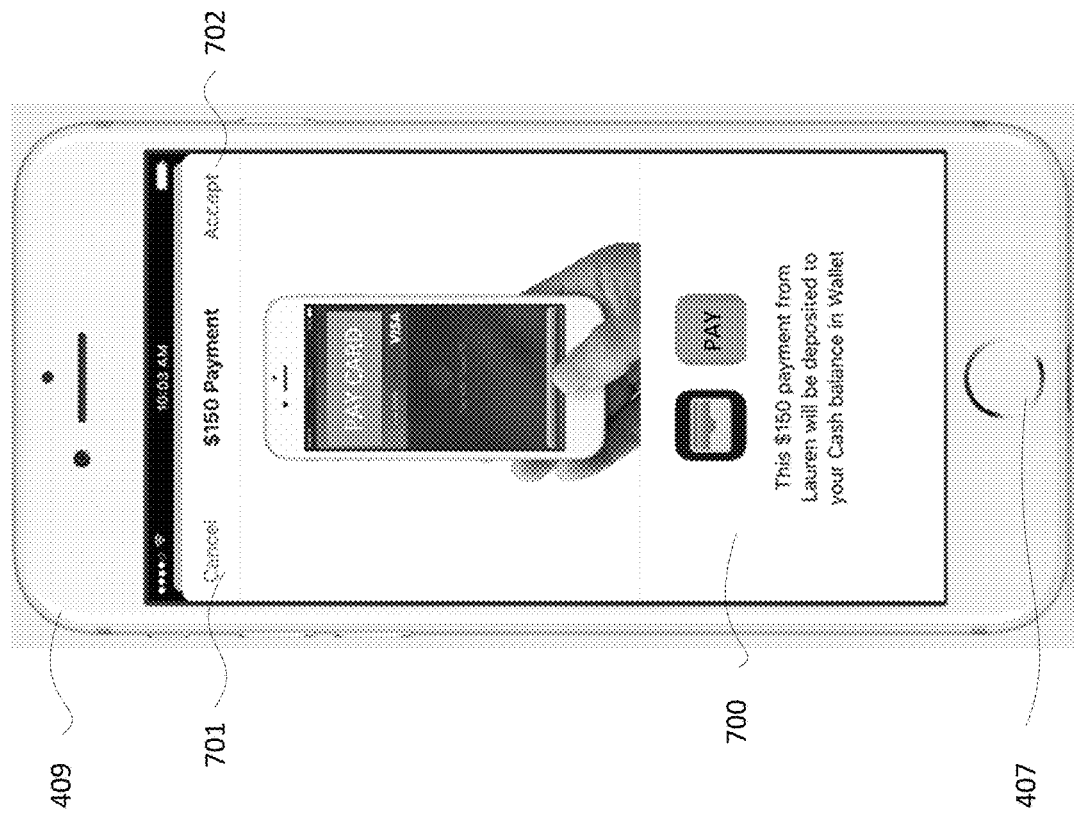
FIG. 7 illustrates an example of seamless integration of a third-party payment application, a native wallet application, and a native communication application, according to an embodiment.

FIG. 7 illustrates an example of seamless integration of a third-party payment application, a native wallet application, and a native communication application, according to an embodiment. The user interface 700 can give the user an option 702 to accept or approve the payment and an option 701 to decline the payment. The user interface 700 can include a message as to the amount of the payment, which in this case is $150. The appearance of the user interface 700 can be different depending on whether the payment recipient is already registered. If the user is not already registered and therefore does not have an account balance, then the user can use a registration process similar to that described with regard to FIG. 2. If the user is enrolled and has an account, the third-party payment application can add cash to the user's account balance in a process similar to that described with regard to FIG. 3. However, the additional cash will come from the sender, Lauren in this case.

Figure 8:
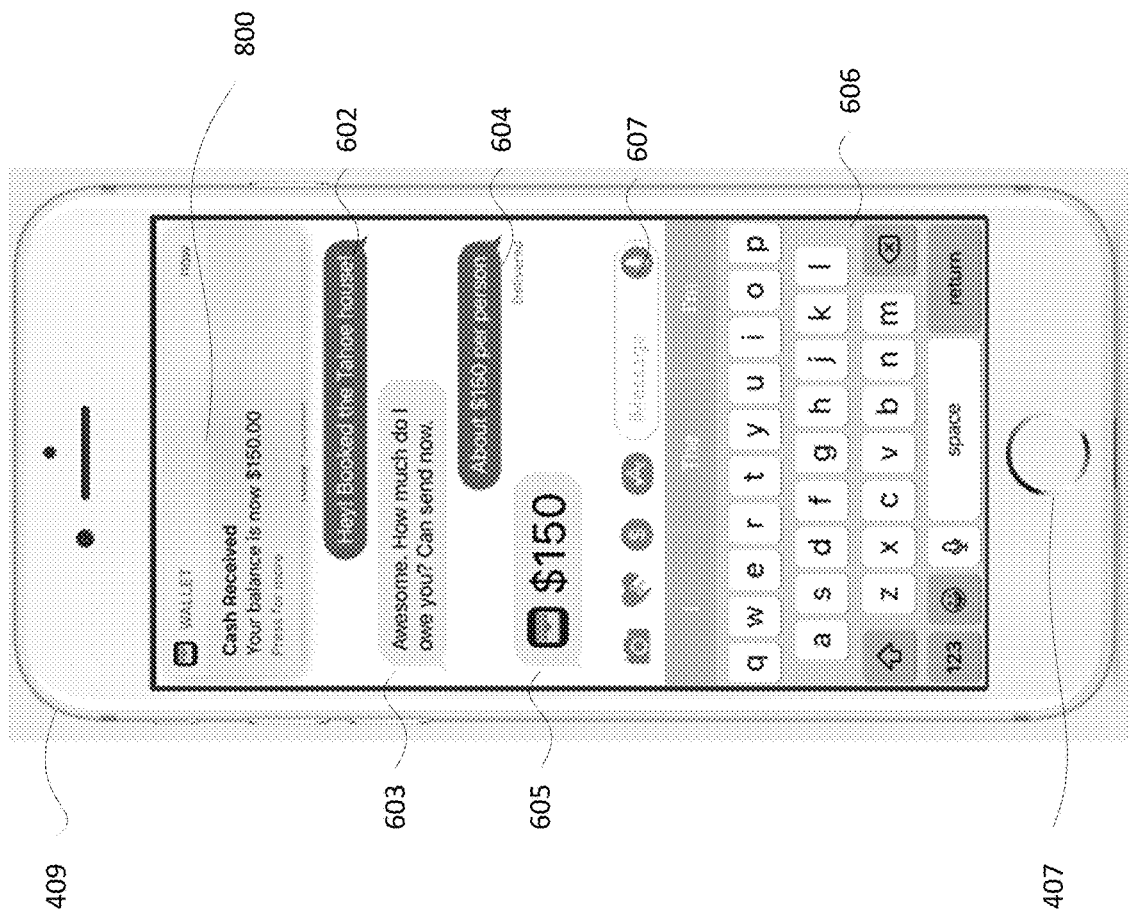
FIG. 8 illustrates another example of seamless integration of a third-party payment application, a native wallet application, and a native communication application, in which the user receives an update on a wallet balance after receiving a payment, according to an embodiment.

FIG. 8 illustrates another example of seamless integration of a third-party payment application, a native wallet application, and a native communication application, in which the user receives a notification 800 of an update on a wallet balance after receiving a payment, according to an embodiment. For example, after the user selects the option 702 to accept the payment, the native communication application can return to the conversation and display the notification 800 identifying that the balance was updated to include the $150. Since the original balance was $0, the notification states that the balance is now $150. The user could then return to the native wallet application (as illustrated in FIG. 4) by, for example, pressing notification 800, to use the cash-out interface 405 to cash out the $150 into a traditional bank account, or keep the balance to use for purchases or to send additional payments.

Figure 9:
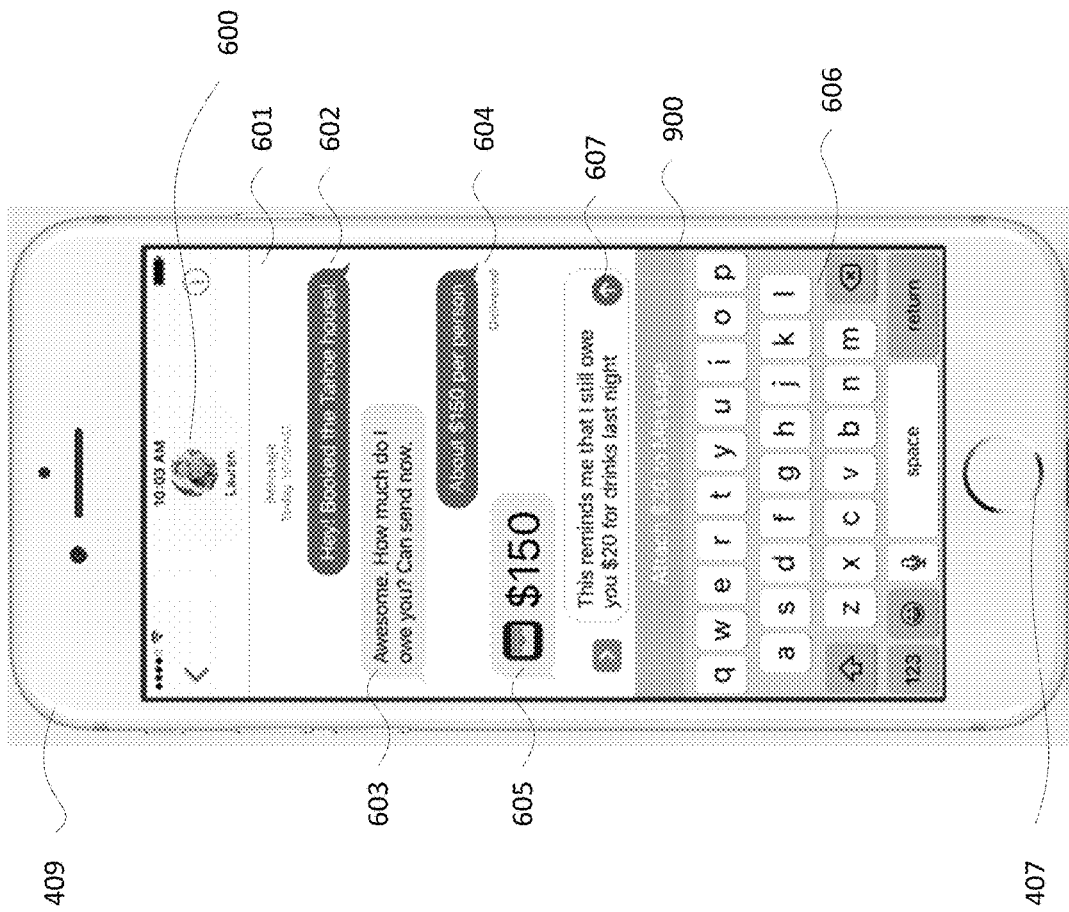
FIG. 9 illustrates an example of seamless integration of a third-party payment application with a native communication application to send a payment, according to an embodiment.
Figure 10:
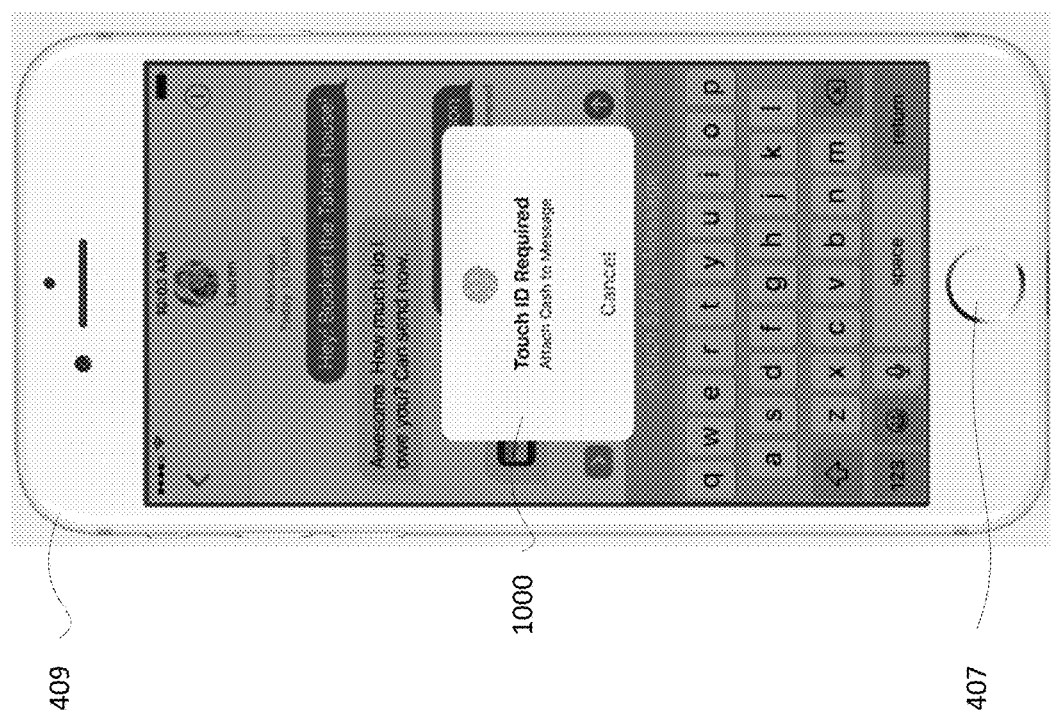
FIG. 10 illustrates an example of the third-party payment application accessing a secure subsystem during a payment made through the native communication application, according to an embodiment.

FIG. 9 illustrates an example of seamless integration of a third-party payment application with a native communication application to send a payment, according to an embodiment. Building upon the examples of FIGS. 6-8, after receiving the $150 from Lauren, the user remembers that she owes Lauren "$20 for drinks last night," as illustrated in field 607 and typed using keyboard 606. As discussed above, the appearance of the '$' symbol followed by a numerical value amount (either an integer (e.g., "10") or text (e.g., "ten")) can be recognized as a payment indication and trigger either the third-party payment application or the native communication application to present the user an option 1000 to attach cash to the message, as illustrated in FIG. 10. The third-party payment application can also verify whether the user's balance is greater than or equal to the numerical value amount of the transaction. If the balance is greater than or equal to the numerical value amount, the third-party payment application can then present the option to the user to attach cash. The user can confirm or decline whether they want to attach cash. The verification of sufficient balance can occur before or after the user confirms whether they want to add cash. If the user has insufficient funds in their balance, they can set an option to use additional funds associated with a bank account or debit card, or either the third-party payment application or the third-party payment server can send a decline message if the balance is less than the payment amount.

FIG. 10 illustrates presenting the user with an option to attach cash to the message. If the user chooses to attach cash to the message, the option 1000 requires confirmation using a fingerprint ID through the secure subsystem 110. If the user inputs their fingerprint by touching fingerprint reader 407, the third-party payment application can attach the $20 to the message as illustrated in FIG. 11.

Figure 11:
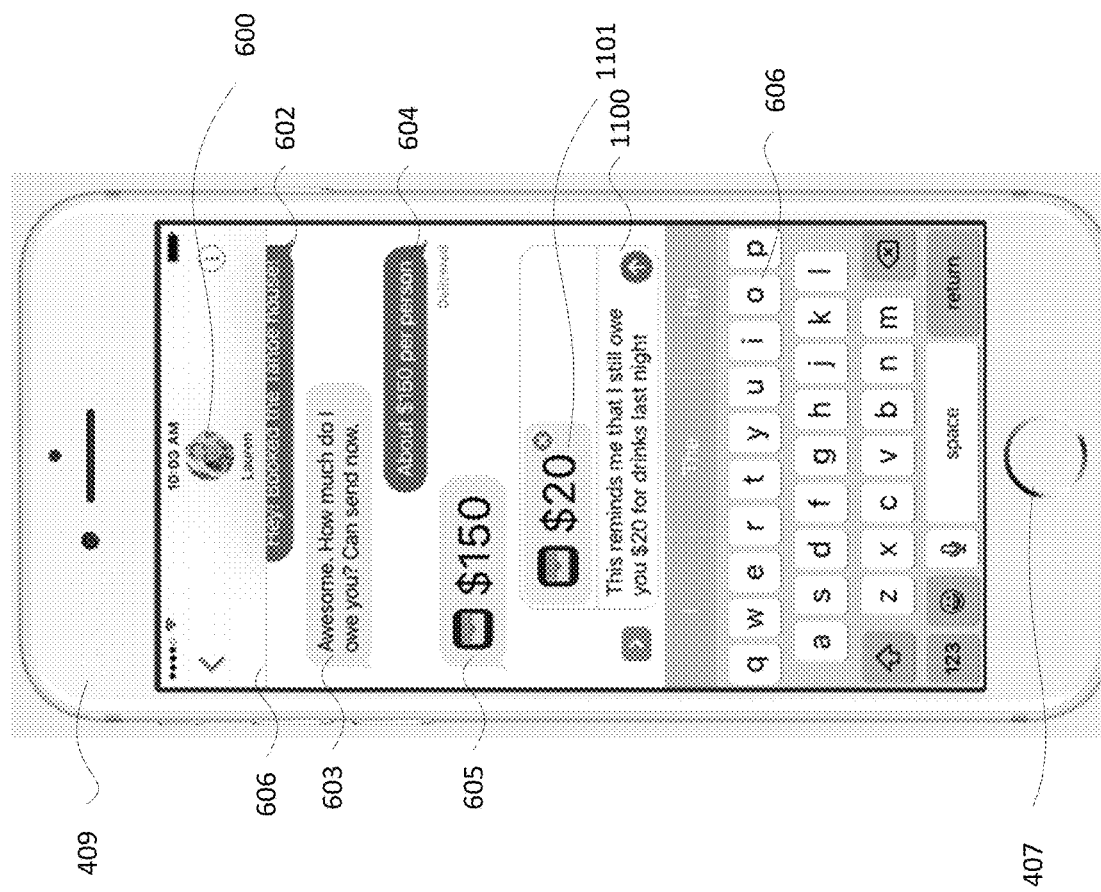
FIG. 11 illustrates another example of seamless integration of a third-party payment application with a native communication application to send a payment, according to an embodiment.

FIG. 11 illustrates presenting the user with the message 1100 that they typed with a $20 included a corresponding payment attachment 1101. That is, the third-party payment application facilitates the generation of the payment attachment 1101 based on an identified intent (e.g., "I still owe you $20) of the user to send $20 to a target recipient within the messaging thread. The user can now edit their message by changing the text or removing the $20. The user could also add more denominations. For example, if the user also wanted to send $30 for dinner after drinks, then the user could include another $30 in cash by typing the string "$30" into message 1100, and the user could send two cash values: $20 and $30. Once the user presses send, the third-party payment application can deduct the amount(s) from the user's balance.

Figure 12:
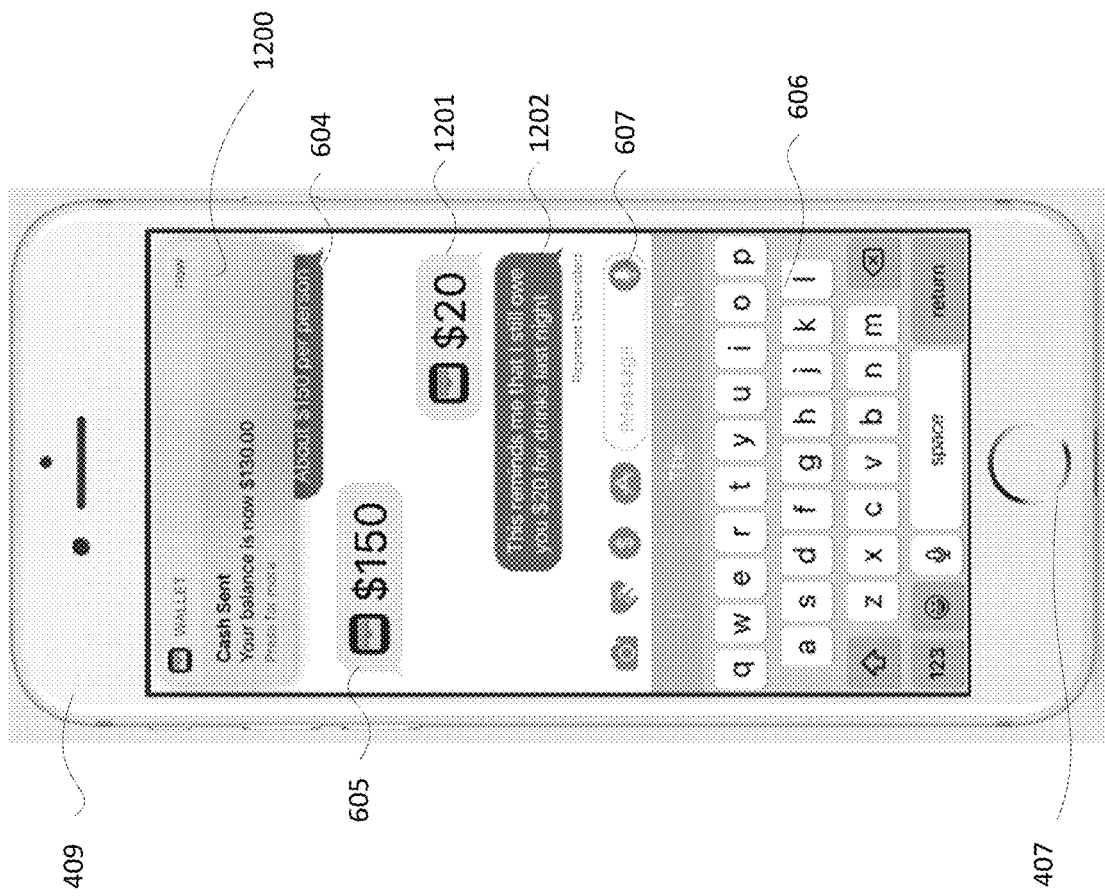
FIG. 12 illustrates an example a notification of a payment sent by the seamlessly integrated third-party payment application, according to an embodiment.

FIG. 12 illustrates an example of the native communication application after the user presses the send button to send the $20 from FIG. 11. In this example, the user receives a notification 1200 to give the user an update that their balance is now $20 less, i.e., $130. The user can also press the notification 1200 to return to the balance in the native wallet application and third-party payment application. The $20 can appear as a separate message 1201, above the text portion of the message 1202 in the native communication application. Lauren can then go through a process as described with respect to FIGS. 6-8 to deposit the $20 into her balance.

Backend of Payment System Architecture

Figure 13:
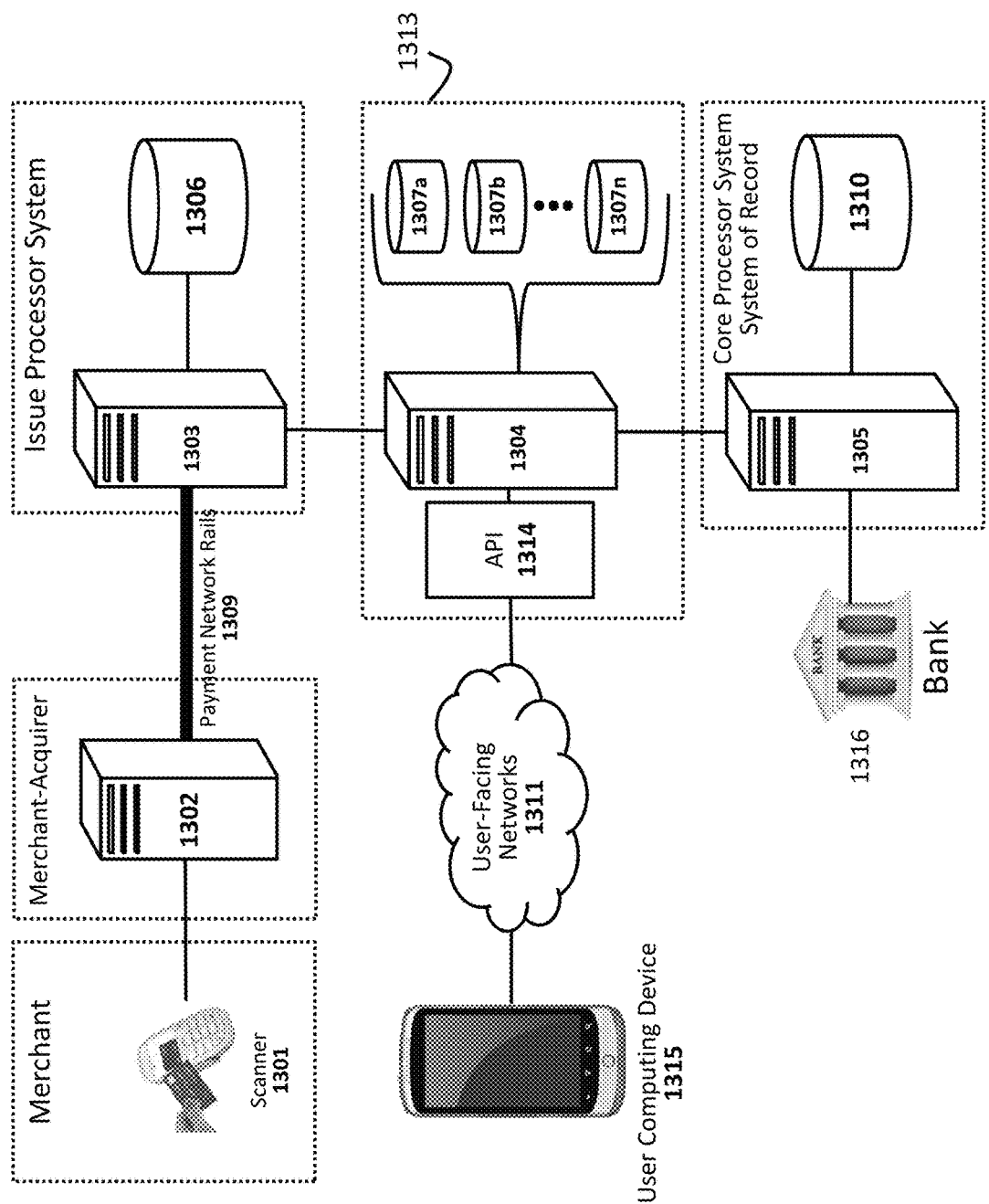
FIG. 13 illustrates an example back end system demonstrating how several components of the system interoperate.

The examples above illustrate software interfaces and some aspects of how hardware and software cooperate to provide integrated third-party applications and native applications, and FIG. 13 illustrates an exemplary network and system architecture for providing payment and loyalty services. Merchant computing device 1301, e.g., a payment terminal, can be a payment card payment processing terminal, such as a payment card scanner or NFC reader, that can request payment authorization to complete a sale. The merchant computing device 1301, which can be any device capable of capturing payment request data on behalf of a merchant, can receive an input (e.g., swipe or dip a card, wireless transmission, keypad entry) of a user's payment card information, such as card verification value (CVV or CVVI), card verification code (CVC or CVC1), card identifier (CID), and payment card number, into the merchant computing device 1301. Non-limiting examples of a merchant computing device 1301 may include a point of sales (POS) terminal, a payment card payment processing terminal (e.g., a payment card scanner), a server for an online site, and a cash register. Non-limiting examples of payment instruments may include magnetic stripe cards, EMV cards, debit cards, credit cards, stored value cards, gift cards, and virtual cards or payment tokens that may be stored on a user computing device 1315 (e.g., user computing device, smartphone, or computer). The merchant computing device 1301 may comprise or may be coupled to various types of instrument readers configured to capture transaction data from certain types of payment instruments. For instance, if the payment instrument is a virtual card stored in a native wallet application or third-party payment application of a user computing device 1315, and the user computing device 1315 is configured to transmit payment request data for the virtual card using near field communications (NFC), then the merchant computing device 1301 may comprise or may be coupled to an NFC scanner configured to capture the transaction data related to the virtual card via the NFC signal received from the user computing device 1315 sent in response to a merchant payment request. The client device can include one or more client applications stored in memory and executed on one or more processors. The client application can present information to the user and receive inputs from the user via, for example, a keyboard, mouse, or touchscreen. The client applications can be stored on a centralized server, such as the Google Play® store or iTunes®, and the user can download the applications from the centralized server to perform functions, such as those describe in this disclosure.

In operation, the merchant computing device 1301 may capture payment card information, sent in response to the merchant payment request, and then generate and transmit a digital message, such as a payment authorization request, comprising the payment card information along with transaction data (e.g., merchant payment amount, merchant identifier) to a merchant-acquirer server 1302. The merchant computing device 1301 may be configured to generate digital messages containing the payment authorization request, which includes the payment card information and transaction data, may be generated according to particular protocols or specifications, e.g., one or more ISO standards in which the payment authorization request can contain certain fields for the payment card information and the transaction data. Non-limiting examples of data fields that may be included the digital message may include a merchant identifier (merchant ID), a merchant category code (MCC), an amount for the transaction, a timestamp (e.g., data, time), and a card number. In some implementations, the merchant computing device 1301 may transmit the digital message containing the card and/or other payment information to a merchant-acquirer server 1302, although in some embodiments, the digital message may be transmitted to other devices, such as an issuer processor server 1303 of an issuer processor system. By having visibility into both ends of the transaction, i.e., at the merchant and at the user computing device, the disclosed system can offer technical solutions not previously available, which will be described in more detail below.

Merchant-Acquirer

A merchant-acquirer server 1302 may be any computing device configured to process an authorization request from a merchant and forward at least some of the information to an issuer processor server 1303 over payment network rails 1309 or card-issuer network (e.g., Visa® or MasterCard® networks). Each merchant computing device 1301 is associated with a merchant-acquirer server 1302 to process payment card payments. Although one merchant computing device 1301 and one merchant-acquirer server 1302 is shown, the system may comprise more than one of each the merchant computing device 1301 and the merchant-acquirer server 1302.

Payment Network Rails

Payment networks (e.g., Visa®, MasterCard®, and American Express®) may be entities that own and operate payment network rails 1309, which may be a computing communications network configured to receive and transmit digital messages between merchants and merchant-acquirers to issuer processors and issuing banks. In operation, merchant computing devices 1301 and merchant-acquirer servers 1302 may generate, manipulate, and transmit digital messages containing payment authorization requests. The digital messages may be generated and manipulated according to the policies, standards, and protocols implemented by each particular payment network.

Issuer Processor

Issuer processor systems can establish payment card number records for customers, issue bills and statements, and process payments. The issuer processor server 1303 can perform these functions and store transactions and payment card numbers in a storage device, such as database 1306. Issuer processors will typically forward payment authorization requests to a system of record server 1305. However, the exemplary system comprises a server 1304 positioned between issuer processor server 1303 and system of record server 1305. Furthermore, server 1304 can perform some or all of the functions typically associated with issuer processors, and therefore, in these embodiments, the merchant-acquirer server 1302 can communicate over the payment network rails with server 1304. Although the issuer processor server 1303 and the server 1304 are shown as separate computing platforms, the issuer processor server 1303 and the server 1304 can be implemented as a single platform. The positioning of server 1304 in between issuer processor server 1303 and system of record server 1305 allows the server 1304 to provide added functionality to the system, such as intervene in and record transactions in the payment stream (e.g., intercept payment authorizations). As a result, server 1304 can also have access to all transactions associated with an account to provide further services to the user computing device 1315 associated with the account.

Note that FIG. 13 illustrates a four-party scheme (or open scheme) in which the issuer processor server 1303 is separate from the merchant-acquirer server 1302. Embodiments of this disclosure can similarly function with three-party schemes (or closed schemes), such as (American Express, Discover Card, and Diners Club), in which the issuer processor server 1303 and the merchant acquirer server 1302 are the same entity.

The server 1304 can be positioned between the issuer processor server 1303 and the system of record server 1305, and can be used as a third-party payment server, or can be used to administer other third-party programs, such as a loyalty program. Server 1304 is part of a consumer computing system ("CC S") 1313, which can also include an application programming interface (API) 1314 and one or more databases 1307a-1307n. Server 1304 can use API 1314 to communicate with user computing device 1315 over user-facing network 1311, such as the internet. The API 1314 can be available across platforms, making services provided by CCS 1313 platform independent. Databases 1307a-1307n can include information such user profiles, account numbers, loyalty programs, and transaction ledgers. With this system architecture, server 1304 can intercept transmissions of transaction messages that occur between issuer processor server 1303 and system of record server 1305. The server 1304 does not need to perform an action on every transaction message, as the server 1304 can just relay the transaction message. After receiving a transaction from issuer processor server 1303 and recording information from that transaction, server 1304 can forward the transaction to system of record server 1305.

System of Record

System of record server 1305 can be hosted by a bank server 1316 or a third party that provides a service to a bank server 1316. Some banks maintain their own system of record servers. The system of record server 1305 maintains the accurate information of the balance of an account maintained by bank server 1316. Other transactions may be pending or in various stages of the payment stream, but the official recordation of those transactions is by the system of record server 1305 and database 1310. Certain parties, such as the account owner, the merchant, the issuer processor, or the CCS 1313, may assume certain risks that an account holder does not have sufficient funds to fund a transaction, until the system of record records and authorizes the transaction. However, these parties may assume that risk to process transactions more quickly and efficiently.

Upon receiving a payment authorization request, server 1304 can forward associated information to system of record server 1305, which maintains an account corresponding to the payment card used in the payment transaction. Bank server 1316 can maintain the account using the system of record server 1305, along with a ledger and other user profile information. System of record server 1305 can also include database 1310 that can store a copy of the ledger associated with the account record.

Server 1304 can also be in communication over user-facing networks 1311 (e.g., the internet) with user computing device 1315. User computing device 1315 is illustrated in FIG. 13 as a smartphone, but can be any computing device, such as any mobile phone, tablet, smart watch, personal data assistant, gaming console, or personal computer. Consumer computing system 1313 can also include several databases in communication with server 1304, such as database 1307a for storing user profile information, and database 1307b for storing balances and ledgers.

Server 1304 can communicate transactions to the system of record server 1305, which can record in database 1310 the payment authorization and further report it to the Federal Reserve and bank server 1316 that maintains the account record associated with the payment card used in the payment authorization. Bank server 1316 may also generate an authorization response to forward to the system of record server 1305, back though other devices in the payment stream and eventually to the merchant computing device 1301 to confirm that the merchant may complete the payment transaction.

Other system configurations are possible too. Each user may not need an individual bank account, and any funds in a user's balance could be pooled together to in other bank accounts, thereby reducing overhead of maintaining one or more physical bank accounts per user. In either case, the CCS 1313 can interface with the user computing device 1315 and the merchant computing device 1301 to process payment transactions as described above and throughout this specification.

The server 1304 can communicate with both the merchant computing device 1301 and the user computing device 1315, and therefore has visibility into both sides of the transaction. By processing the payment and having visibility into who is making the payment, the CCS 1313 can provide additional technical services to both the merchant and the consumer. Below are examples that the disclosed technology enables to provide additional technical features to users.

One example of an additional service, the CCS 1313 can update the merchant computing device 1301 to deliver specialized codes at NFC readers to present loyalty information, such as promotions, sweepstakes, cash-back rewards, subsidized rewards, a reward pass, or loyalty cards to user computing device 1315, given that the user computing device uses the third-party payment application supported by the CCS 1313. The specialized NFC code can cause the user computing device to query automatically the user whether they would like to use the third-party payment application so that the receive awards that the particular purchase has associated with it. If the third-party payment application is associated with both the user computing device 1315 and the merchant computing device 1301, the third-party payment application has access to each device's information, e.g., identity and items being purchased. By knowing this information, the third-party payment application can appropriately assign a loyalty card. For example, if the user is purchasing a sandwich and a drink, the user could get two loyalty cards: one for the sandwich and another for the drink. This is possible because of the visibility that the system has on both ends of the transaction. In addition, the CCS 1313 can update information that the merchant computing device sends to the user computing device. For example, the merchant computing device can inform the third-party payment application on the user computing device that there is a current promotion or new loyalty program. If the user computing device does not have the third-party payment application, then the NFC transaction would simply complete as normal, i.e., payment would continue as normal. However, when the CCS 1313 has visibility on both ends, there can be such added functionality.

A second example of an additional service is being compatible across platforms. For example, the third-party applications are often available on multiple platforms and can interoperate. However, native applications might not interoperate. Third-party applications typically work across platforms. Therefore, third-party applications integrated with native applications can interoperate across platforms, irrespective of whether the third-party applications are integrated with native applications. If a third-party application is integrated on one platform, it can interoperate with a discrete third-party application on another platform to provide similar services, but perhaps in a less seamless environment.

A third example of an additional service is having the ability to give merchants or consumers additional information about each other to increase value. Users can get special offers and merchants can increase sales by creating mutually beneficial relationships. Users can get information about merchant services that they might be interested in, and merchants could know when a customer is nearby and prepare for their visit by offering special treatment, such as a reserved table or special menu items.

As a fourth example of an additional service, a user can have sub-accounts associated with their account. The balance presented to the user, e.g., balance 402 of FIG. 4, can be a sub-account balance for purchases made on the user computing device 409. The user can have more money maintained by the CCS 1313 for other purposes, such as saving for a vacation. The CCS 1313 can allow for the user to add cash or cash out to the balance 402 via many interfaces on many platforms, even over a website. These embodiments allow for immediate updating of accounts during credit or debit transactions because the transactions occur using the sub-accounts, thereby updating the account record and sub-account records in real-time, rather than processing credit and debit transactions after the transaction completes.

A fifth example of the benefits of integration is that the native platform can use the third-party application as a "white label" service; that is, the native application can present the third-party services as native services, when they are actually being handled by integrated third-party software. By providing a "white label" service, the user can more easily access the services of the third-party payment application, and the native OEM platform will be more useful to the user.

The CCS 1313 can do this by storing information received from the merchant and the user computing device 1315, and sharing that information between the two. If a user computing device 1315 access a merchant's loyalty card, the CCS 1313 can inform the merchant via a merchant's user computing device (not illustrated) that the user is nearby and is interested in visiting the merchant, and the merchant can take steps to prepare for that customers visit. If the CCS 1313 informs the merchant user computing device that several customers are possibly coming, the merchant can provide additional staff or prepare additional food due to the planned rush. In contrast, if there is an unusually low number of customers interested in visiting the merchant that day, the merchant can reduce staff or prepare less food to reduce waste.

Hence, the arrangement of the CCS 1313 between both the user computing device 1315 and the merchant computing device 1301, in addition to the integration of the third-party payment application and the native wallet application, provides for the ability to give users many features that they do not currently enjoy.

Example Payments User Interface of Integrated Third-Party Payment Applications

Due to the integration of the third-party payment application and native wallet application, the third-party payment application can have access to other hardware devices in the user computing device that other third-party applications do not have access to, such as an NFC transceiver. The NFC transceiver can be accessed, for example, as a secure element 117 of the secure subsystem 110.

Figure 14:
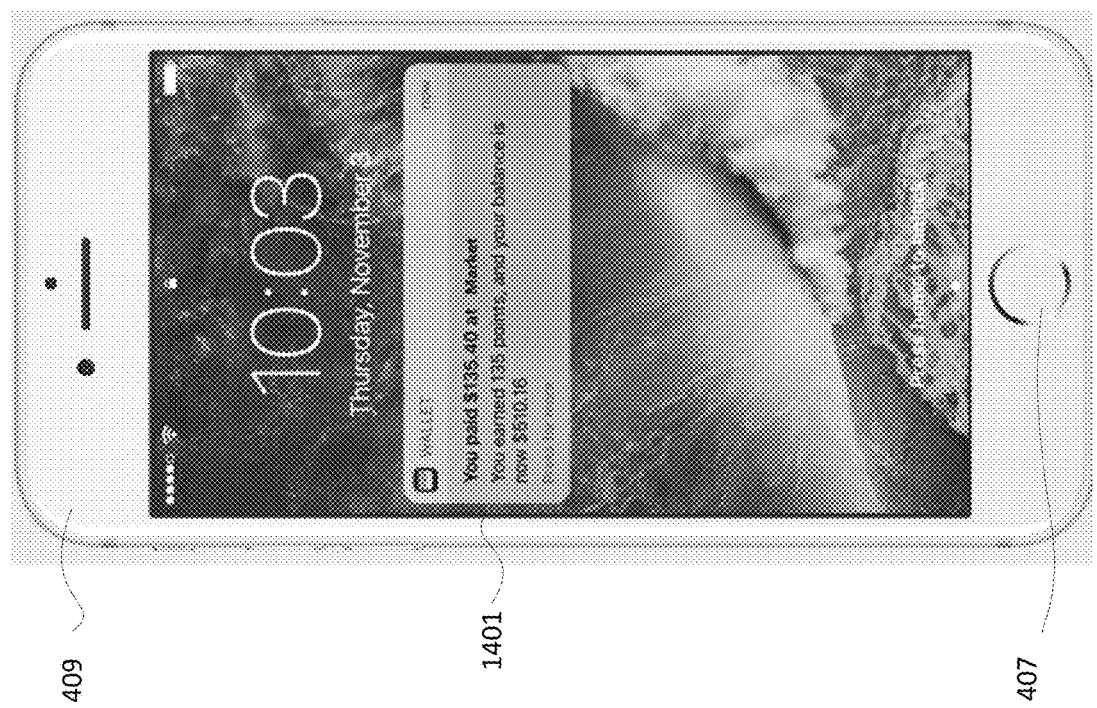
FIG. 14 illustrates an example of a notification of a payment and an updated balance using the seamlessly integrated third-party payment application and native wallet application, according to an embodiment.

FIG. 14 illustrates an example of a user computing device receiving a notification of payment 1401 of having made a payment of "$135.40 at Market" and the user's "balance is now $510.16." The user could have made an electronic payment using their user computing device, and the payment was logged by the native wallet application. The notification 1401 also states that the user "earned 135 points" in the transaction. Earning points and other loyalty rewards are an additional benefit of the disclosed integration, which FIGS.

15-16 further illustrate. The notification can appear in different places depending on whether the mobile device is locked or unlocked, or depending on other states of the mobile device.

Example Loyalty Program Integrated with a Native Wallet Application and Third-Party Payment Application As previously explained, having visibility to at both the merchant computing device and the user computing device during a payment transaction allows for increased functionality, such as being able to offer and track loyalty programs. In an example payment transaction, the merchant computing device 1301 can transmit a code to the user computing device via an NFC code—the NFC code corresponding to a loyalty program code. The user computing device 1315 can decode the NFC code to understand that the NFC code corresponds to a loyalty program. The user computing device 1315 can then transmit a payment token to the merchant computing device 1301, which can then forward the payment token and other information to the third-party server 1304. The third-party server 1304 can then associate the payment request with a user account and an associated loyalty program status. If the payment transaction includes an eligible purchase, such as a sandwich, the third-party server 1304 can verify that the user has sufficient funds to purchase the sandwich. If the user has sufficient funds, the third-party server 1304 can retrieve the loyalty program status from one of databases 1307a-n, and generate an updated loyalty program status reflecting the new purchase. The third-party server 1304 can also generate and transmit a transaction status message identifying whether the user has sufficient funds to pay for the transaction. If the updated loyalty program status identifies that the user has earned a reward, the third-party server 1304 can automatically redeem the earned reward by deducting the value of the reward, e.g., a free sandwich, from the payment transaction. Alternatively, the third-party server 1304 can prompt the user computing device 1315 to determine whether the user wishes to redeem the reward. Various embodiments of loyalty cards are illustrated in FIGS. 14-18.

The third-party server 1304 can transmit the updated loyalty program status to the third-party payment application or third-party loyalty application, which can then generate a user interface comprising the updated loyalty program status for display on the user computing device. Note that embodiments include the third-party payment application and third-party loyalty application being separate or integrated. These third-party applications can then present the user interface themselves, use a native application to display the user interface, or use one or more APIs offered by the OEM operating system to display the user interface.

Another benefit of the disclosed system architecture includes the ability of the third-party server 1304 to update the NFC code at merchant computing device 1301. In this way, the third-party server 1304 can modify loyalty programs in real time by updating loyalty program codes at merchant computing devices 1301. Therefore, merchants can quickly add, delete, or modify rewards programs to suit their needs.

Figure 15:
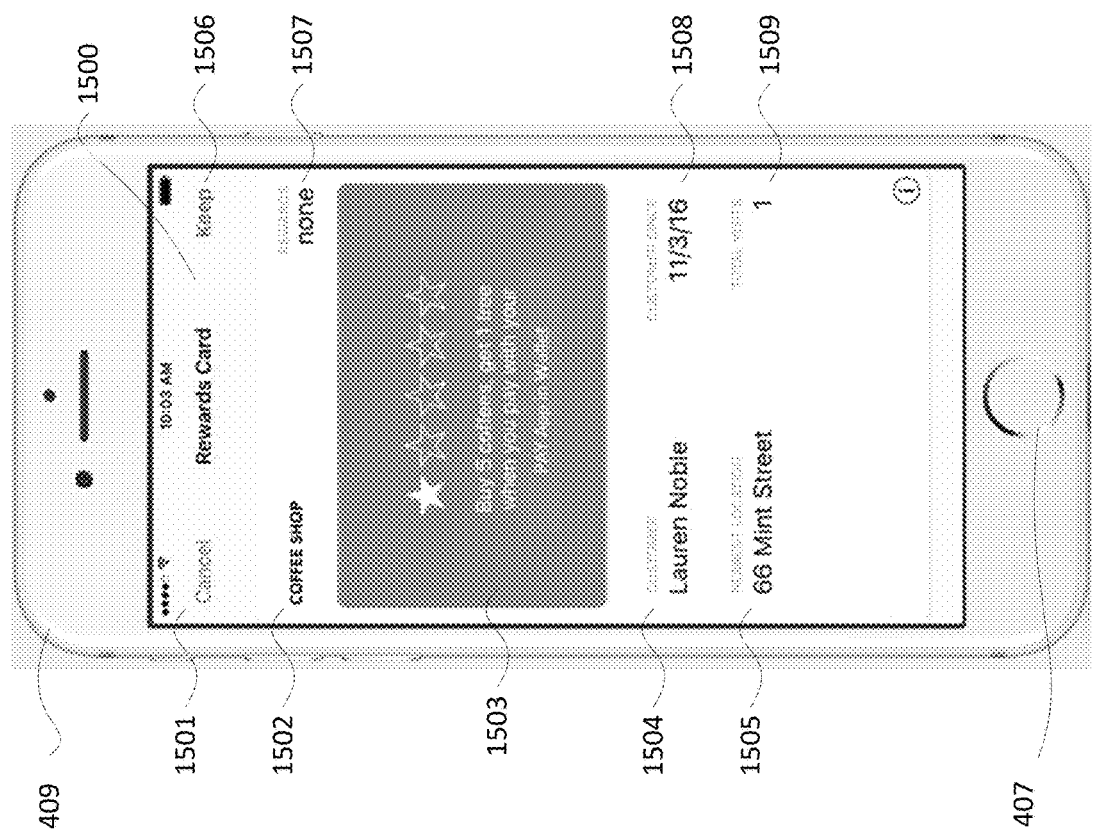
FIG. 15 illustrates an example a seamlessly integrated third-party payment application with a loyalty card function after processing a payment, according to an embodiment.

In addition to receiving the notification 1401 of payment, illustrated in FIG. 14, the user can receive a loyalty card 1500, as illustrated in FIG. 15. The loyalty card 1500 may be part of the third-party payment application, the native wallet application, or a separate third-party application. The loyalty card 1500 can include several pieces of information, including the name of the shop 1502, which in this example is "coffee shop," an image of a rewards card 1503, which includes 5 stars—one filled in since this is the user's first purchase with the card—and an indication that the purchase of 5 coffees gets 1 free coffee, if the user uses the third-party payment application. The loyalty card can further include the user's name 1504, Lauren Noble, the nearest location for the store 1505, 66 Mint Street, the number of visits the user made 1509, 1, the date that the user became a customer 1508, 11/3/16, and any rewards the user has earned 1507, "none" in this example but could include any number of rewards including contest entries, cash, or merchandise. The user can also have the option 1501 to cancel the loyalty card and an option 1506 to keep the loyalty card.

Figure 16:
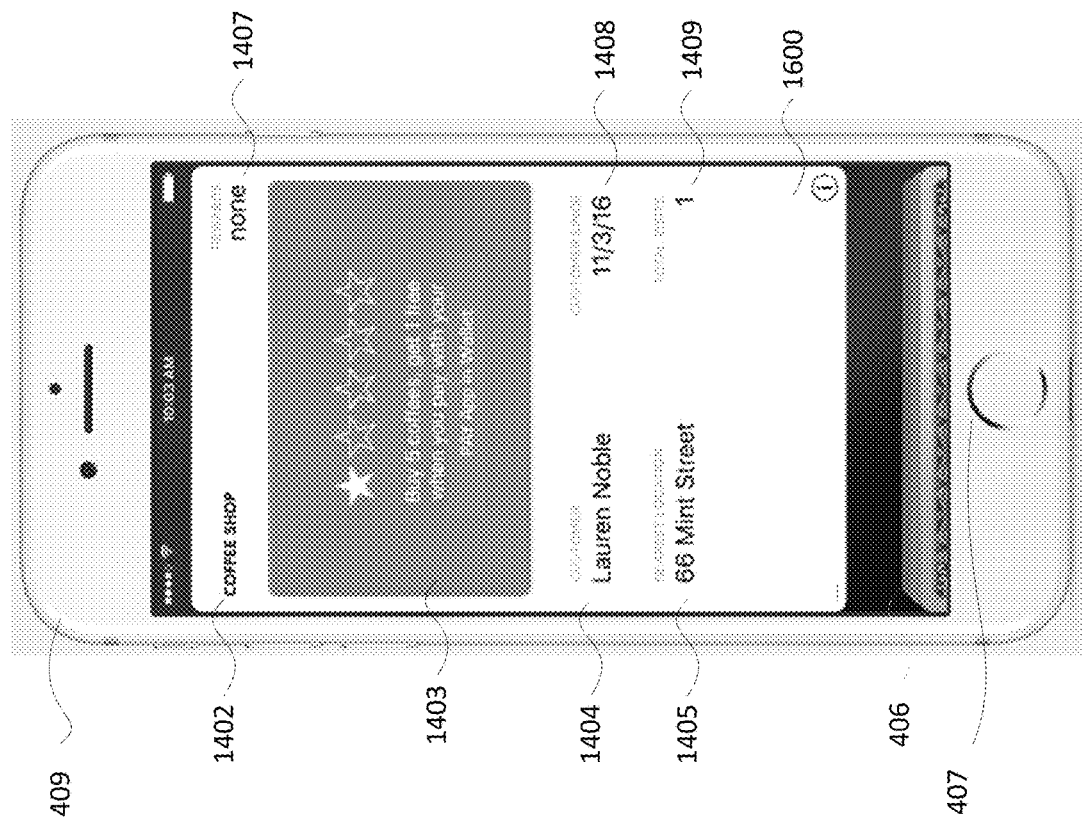
FIG. 16 illustrates another example of the seamlessly integrated third-party payment application with a loyalty card function with a native wallet application, according to an embodiment.

FIG. 16 illustrates an example of the user having selected the option 1506 to keep the loyalty card. In this example, the loyalty card 1600 is stored in the native wallet application 406. The loyalty card 1600 has much of the same information as the loyalty card 1500, except that it appears in the native wallet application rather than separated from it because the user selected the option 1506 to keep the loyalty card. The user can toggle between different cards as illustrated at the bottom of the native wallet application 406.

While FIGS. 15-16 illustrate a five-star loyalty rewards program, where the purchase of five items results in a free item, other embodiments include other rewards, such as points or cash back. The points can be exchanged for free items, discounts, sweepstakes or cash. The integration of these loyalty programs with a native application allows for seamlessly giving users access to their loyalty programs, which increases use and interest in users. Without such seamless integration, users would have to remember to use their loyalty programs or request to register for loyalty programs. By integrating the third-party loyalty application with a native application, such as a wallet or map application, the user will receive reminders or automatic registration and tracking of loyalty programs. For example, simply by purchasing an item that is eligible for a rewards program, the third-party payment application can automatically present the user an option to join the loyalty program. Users can also access their loyalty programs across platforms.

Example Loyalty Program Integrated with a Native Map Application

Figure 17:
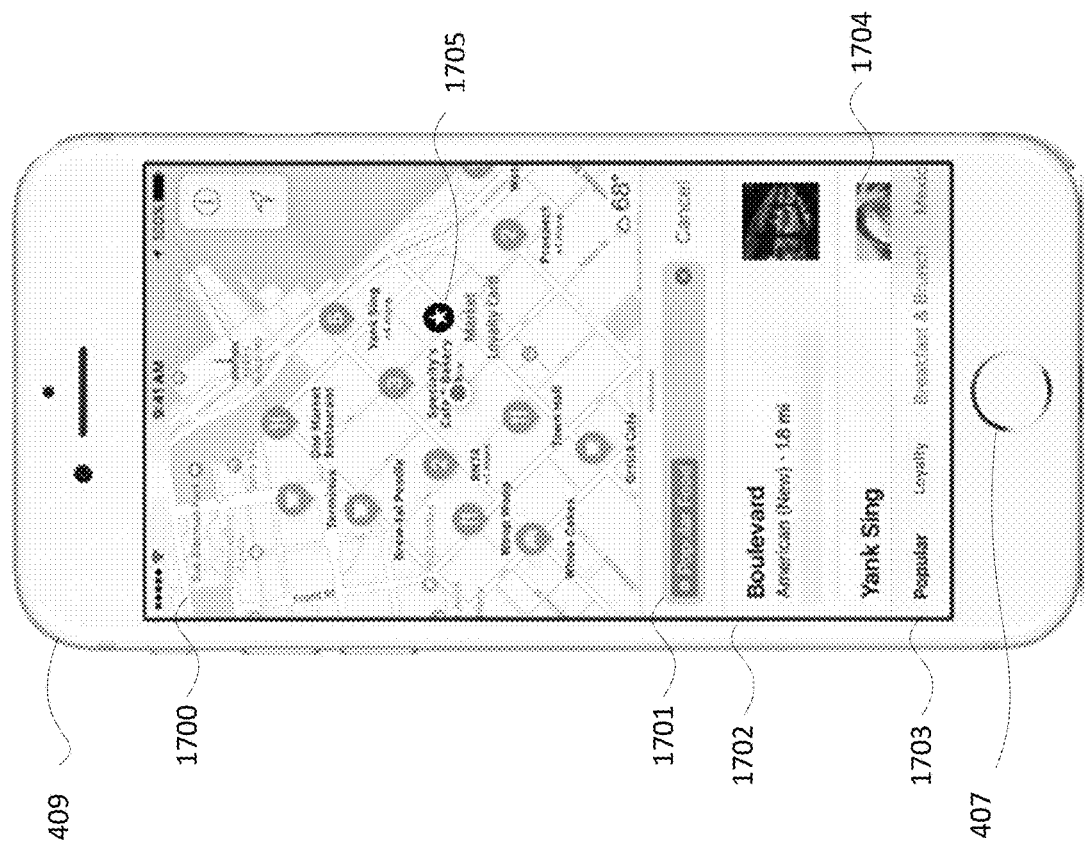
FIG. 17 illustrates an example of the seamlessly integrated third-party payment application with a loyalty card function with a native map application, according to an embodiment.

FIG. 17 illustrates an example of the seamlessly integrated third-party payment application with a loyalty application with a native map application 1700, according to an embodiment. The native map application 1700 includes a search field 1701, which in this case contains a search for "popular food" and produced a list of merchants 1702, images 1704 related to those restaurants, and their merchant locations on a map. The locations of the restaurants can have several icons. A subset of merchant location icons, such as icon 1705 identifying a "market," can look different from the other, unlabeled icons to distinguish it as being associated with a loyalty application or loyalty program, and in this example icon 1705 is a different color and contains a star. The icon 1705 can also have a label ("Loyalty Card"), proximate to the icon, identifying it as associated with a loyalty card program. The native map application 1700 can also include a ribbon 1703 at the bottom, which includes a "loyalty" option that can be selected to view all merchants that have a compatible loyalty application. If a user selects an icon associated with a loyalty program, such as icon 1705, then the user computing device 409 can display information about the loyalty program, as illustrated in FIG. 18.

There are various ways that the native map application 1700 can identify merchants that are associated with a loyalty card program. In one embodiment, an OEM server can store information about which merchants are associated with the loyalty card program. In a second embodiment, a server, such as server 1304 of CCS 1313, can maintain loyalty card information and transmit the information to the native map application 1700 via a third-party loyalty application and API 1314. Alternatively, the server 1304 can also send information, about which merchant locations are associated with loyalty programs, to a user computing device via a server maintained by a user computing device OEM. The information about which merchant locations are associated with loyalty programs can include an indication, such as a flag, that indicates a specific merchant is so affiliated. In a third embodiment, a separate party can maintain information concerning loyalty card programs. Other configurations are possible. In each embodiment, however, the native map application receives the information about loyalty card program participation, which can be displayed to the user via the native map application 1700.

Figure 18:
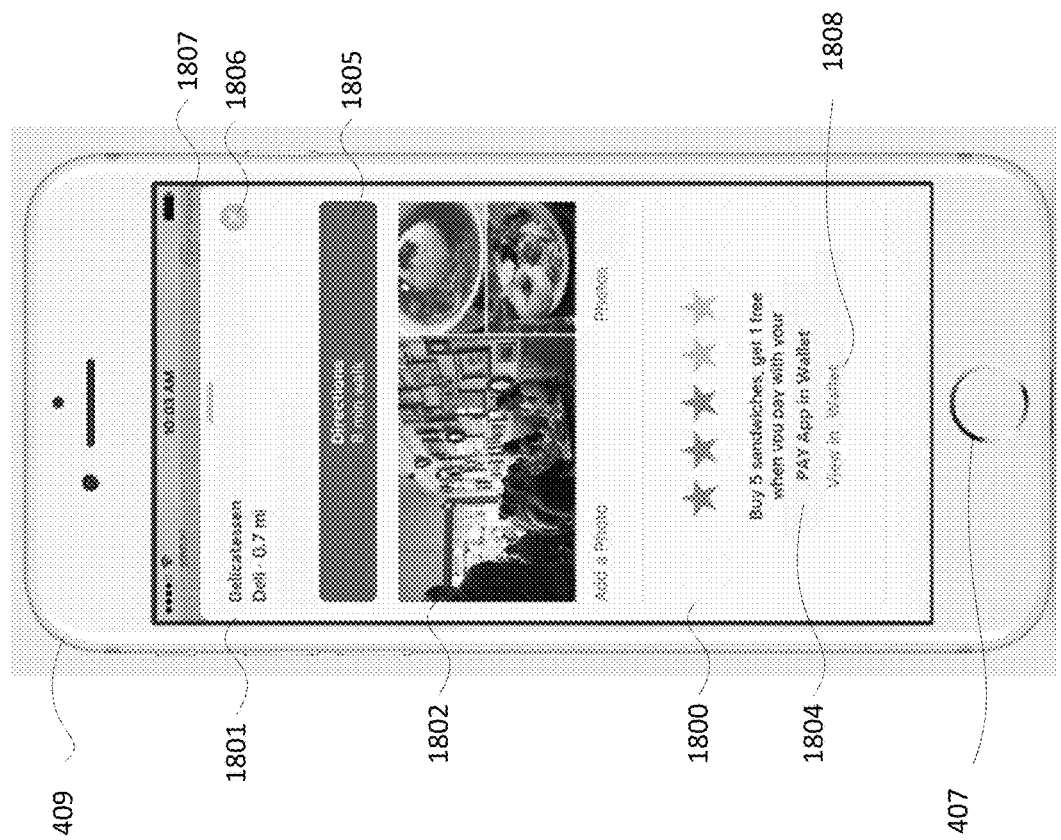
FIG. 18 illustrates an example of the seamlessly integrated third-party payment application with a loyalty card function with a native map application, according to an embodiment.

FIG. 18 illustrates an example of the seamlessly integrated third-party payment application with a third-party loyalty application 1800, both of which are integrated with a native map application 1807, which you can see in the background, according to an embodiment. If a user selects a merchant that appears in the native map application 1807 (which appears in the background of FIG. 18), and the merchant is associated with a loyalty card program, then the third-party loyalty application 1800 for that merchant can automatically appear on the user computing device in response to a purchase. The third-party loyalty application 1800 can include information 1801 about the merchant, including its name (Delicatessen), its type (Deli), and its distance from the user computing device (0.7 mi). (Note that FIG. 17 illustrates a market, which can include similar information.) The third-party loyalty application 1800 can further include photos of the merchant 1802, and information 1804 about the loyalty application. The information 1804 can include the user's loyalty status, which in this case is three sandwiches, purchased using the third-party payment application, out of five necessary for a free sandwich. The third-party loyalty application 1800 can also include an option 1808 to view loyalty application 1800 inside of the native wallet application. The loyalty card can also be integrated such that it can include a button 1805 to activate directions to the merchant on native map application 1807. Finally, the loyalty application 1800 can include a button 1806 to close the application.

Integrating Multiple Native Applications and a Third-Party Payment Application

As explained above, the third-party payment application can have a deep integration with native applications to have access to a secure environment and provide seamless services, as if the third-party payment application is itself a native application. As discussed above, the third-party payment application can be integrated with a native communication application, a native wallet application, and a native wallet application. Other native applications that the third-party payment application can be integrated with can include native purchasing applications, such as an app store, a book store, or any digital media store that are often native to computing platforms. Other examples include integrating information stored by the third-party payment application with a native health application. For example, due to the deep visibility the CCS 1313 gains from both the merchant and the user, the third-party payment application can inform the native health app about the user's health-related purchases, including prescription drugs, vitamins, food choices, and gym memberships. Such information can be stored on one or more databases 1307a-1307n, and transmitted to an integrated third-party payment application via user-facing networks 1311 through API 1314.

Integration with Other Applications

As explained previously, the integrated third-party applications might have reduced, special-purpose functionality, or they may be fully functional. In embodiments where they have reduced, special-purpose functionality, users can download more feature-rich, separate third-party applications if they need to use those features. The integrated application can communicate information to the separate application via inter-application communication or by updating the third-party payment server on the backend, which each application can communicate with. Moreover, settings, such as whether to use a debit card in the case of an overdraft, can be modified across all platforms, e.g., the web, the integrated third-party payment application, and the more feature rich third-party payment application.

Although certain illustrative, non-limiting exemplary embodiments have been presented, various changes, substitutions, permutations, and alterations can be made without departing from the scope of the appended claims. Further, the steps of the methods described herein may be carried out in any suitable order, or simultaneously where appropriate. Thus, the scope of the invention should not necessarily be limited by this description.

Unless specifically stated otherwise as apparent from the following discussion, it is appreciated that throughout the description, discussions utilizing terms such as "processing," "computing," "transmitting," "receiving," "determining," "displaying," "identifying," "presenting," "establishing," or the like, can refer to the action and processes of a data processing system, or similar electronic device that manipulates and transforms data represented as physical (electronic) quantities within the system's registers and memories into other data similarly represented as physical quantities within the system's memories or registers or other such information storage, transmission or display devices. The system or portions thereof may be installed on an electronic device.

The exemplary embodiments can relate to an apparatus for performing one or more of the functions described herein. This apparatus may be specially constructed for the required purposes, or it may comprise a special purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions for operations on a processor, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like.

In general, any device capable of implementing the processes described herein can be used to implement the systems and techniques according to this invention.

The exemplary embodiments can relate to an apparatus for performing one or more of the functions described herein. This apparatus may be specially constructed for the required purposes or be selectively activated or reconfigured by computer executable instructions stored in non-transitory computer memory medium or non-transitory computer-readable storage medium.

It is to be appreciated that the various components of the technology can be located at distant portions of a distributed network or the Internet, or within a dedicated secured, unsecured, addressed/encoded or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying or communicating data to and from the connected elements. The term "module" as used herein can refer to any known or later developed hardware, software, firmware, or combination thereof that is capable of performing the functionality associated with that element.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Presently preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

We claim:

1. A system comprising:
a third-party payment server configured to receive payment authorization requests from a merchant-acquirer server and to receive user registration requests from one or more user computing devices;
a user computing device comprising a processor and configured to transmit the user registration request to the third-party payment server and including:
a native wallet application stored in a memory of the user computing device;
a third-party payment application integrated with the native wallet application, wherein the third-party payment application is configured to receive a user registration request from the native wallet application;
a normal subsystem; and
a secure subsystem, separate from the normal subsystem, comprising one or more secure elements and a secure operating system, wherein the third-party payment application is integrated with the native wallet application, wherein the third-party payment application can execute within the secure subsystem via the secure operating system,
wherein the one or more secure elements are accessible by the third-party payment application based on the processor being in a secure mode, and wherein the one or more secure elements comprise one or more hardware components,
wherein the native wallet application is configured to receive the user registration request from a user,
wherein the third-party payment application is configured to receive the user registration request from the native wallet application and generate a user interface to register a user,
wherein the native wallet application is configured to:
display the user interface,
receive user registration information via the user interface, and
send the user registration information to the third-party payment application,
wherein the third-party payment application is configured to send the user registration information to the third-party payment server,
wherein, in response to receiving the user registration request, the third-party payment server is configured to associate the user registration request with a user account comprising an account number and an account balance;

wherein the third-party payment server is further configured to generate a payment token corresponding to the account balance and to transmit the payment token to the third-party payment application;

wherein the secure subsystem is configured to receive the payment token from the third-party payment application;

wherein the user computing device is further configured to receive the account balance from the third-party payment application, based on the payment token and via the native wallet application, and to display the account balance on the user interface;

wherein the user computing device is further configured to transmit the payment token to a merchant computing device involving a payment transaction between the user and a merchant associated with the merchant computing device; and the merchant computing device, in response to receiving the payment token, is configured to transmit a payment authorization request comprising the payment token, through the merchant-acquirer server, to the third-party payment server.

2. The system according to claim 1, wherein the secure subsystem is further configured to transmit the payment token to the merchant computing device, and the merchant computing device is further configured to transmit the payment token and a payment amount to the third-party payment server.

3. The system according to claim 2, wherein the third-party payment server is further configured to deduct the payment amount from the account balance associated with the payment token.

4. The system according to claim 3, wherein the third-party payment server is further configured to transmit a notification of the payment transaction to the third-party payment application.

5. The system according to claim 1, wherein the user computing device further comprises a native communication application that communicates with the third-party payment application that further communicates with the secure subsystem to effect the payment transaction from the account balance.

6. The system according to claim 1, wherein the user computing device further comprises a native communication application that communicates with the third-party payment application that further communicates with the secure subsystem to receive a payment comprising an amount, and to add the amount to the account balance.

7. The system according to claim 1, wherein the third-party payment application further comprises an interface to perform an add-cash request and a cash-out request.

8. The system of claim 7, wherein the third-party payment application, upon receiving the add-cash request or the cash-out request, is further configured to generate a prompt to download a separate application to complete either the add-cash request or the cash-out request.

9. The system of claim 8, wherein the separate application is configured to complete the add-cash request or the cash-out request.

10. The system according to claim 1, further comprising a secure operating system that is separate from a native operating system, and the third-party payment application is integrated with the native wallet application, such that the third-party payment application is supported by the secure operating system.

11. The system according to claim 1, wherein the third-party payment application integrated with the native wallet application has appropriate permissions to access the secure subsystem.

12. The system according to claim 1, wherein the third-party payment application integrated with the native wallet application has permissions to operate a thread in a secure mode.

13. The system according to claim 1, wherein the one or more secure elements comprise a fingerprint reader.

* * * * *